United States Patent
Takeda et al.

(10) Patent No.: US 8,818,672 B2
(45) Date of Patent: Aug. 26, 2014

(54) BRAKE CONTROL APPARATUS

(75) Inventors: Hiroki Takeda, Kanagawa (JP); Tohma Yamaguchi, Kanagawa (JP)

(73) Assignee: Hitachi Automotive Systems, Ltd., Ibaraki (JP)

( * ) Notice: Subject to any disclaimer, the term of this patent is extended or adjusted under 35 U.S.C. 154(b) by 0 days.

(21) Appl. No.: 13/825,624

(22) PCT Filed: Feb. 28, 2012

(86) PCT No.: PCT/JP2012/055006
§ 371 (c)(1),
(2), (4) Date: Apr. 12, 2013

(87) PCT Pub. No.: WO2012/118103
PCT Pub. Date: Sep. 7, 2012

(65) Prior Publication Data
US 2013/0197771 A1 Aug. 1, 2013

(30) Foreign Application Priority Data

Feb. 28, 2011 (JP) .................................. 2011-042875

(51) Int. Cl.
*B60T 8/88* (2006.01)
*B60T 13/74* (2006.01)
(52) U.S. Cl.
CPC .................................. *B60T 13/745* (2013.01)
USPC ................ 701/70; 303/10; 303/20; 303/22.4; 303/28; 701/36; 701/29.1; 701/29.2; 701/29.7; 701/29.9; 701/30.8
(58) Field of Classification Search
CPC ............... B60T 7/00–7/06; B60T 7/12; B60T 2201/00; B60T 2270/40–2270/415
See application file for complete search history.

(56) References Cited

U.S. PATENT DOCUMENTS

2001/0006308 A1\* 7/2001 Kawahata et al. ............. 303/122
2002/0096939 A1\* 7/2002 Sakata et al. ................ 303/119.1
(Continued)

FOREIGN PATENT DOCUMENTS

JP 11-245796 9/1999
JP 2000-52965 2/2000
(Continued)

OTHER PUBLICATIONS

International Search Report issued Jun. 5, 2012 in International (PCT) Application No. PCT/JP2012/055006.

*Primary Examiner* — Jonathan M Dager
(74) *Attorney, Agent, or Firm* — Wenderoth, Lind & Ponack, LLP

(57) ABSTRACT

A controller sets a target hydraulic pressure of a master cylinder based on the operation amount of a brake pedal, and controls the action of an electric motor so that a master cylinder hydraulic pressure attains the target hydraulic pressure. A brake characteristic representing a relationship between a motor rotation position detected by a resolver and the master cylinder hydraulic pressure as detected by the hydraulic pressure sensor is stored and updated. When the hydraulic pressure sensor is abnormal, a target motor rotation position corresponding to the target hydraulic pressure is set using the updated brake characteristic, and the action of the electric motor is controlled. The electric motor is controlled based on the updated brake characteristic, and hence fluctuations in the vehicle deceleration with respect to the brake operation can be suppressed and a sense of discomfort for the driver can be alleviated.

7 Claims, 12 Drawing Sheets

(56) References Cited

U.S. PATENT DOCUMENTS

| | | | |
|---|---|---|---|
| 2002/0149259 A1* | 10/2002 | Otomo et al. | 303/3 |
| 2006/0055233 A1* | 3/2006 | Ohishi et al. | 303/11 |
| 2007/0159002 A1* | 7/2007 | Otomo et al. | 303/119.2 |
| 2008/0257670 A1* | 10/2008 | Drumm et al. | 188/358 |
| 2009/0039702 A1* | 2/2009 | Nishino et al. | 303/114.1 |
| 2009/0072615 A1* | 3/2009 | Oosawa et al. | 303/113.1 |
| 2009/0234552 A1* | 9/2009 | Takeda et al. | 701/96 |
| 2009/0261649 A1* | 10/2009 | Higuma et al. | 303/113.3 |
| 2010/0062897 A1* | 3/2010 | Nishino et al. | 477/29 |
| 2011/0025119 A1* | 2/2011 | Nishino et al. | 303/3 |
| 2011/0066345 A1* | 3/2011 | Nasu et al. | 701/70 |
| 2011/0077831 A1* | 3/2011 | Nishino et al. | 701/70 |
| 2011/0241418 A1* | 10/2011 | Nozawa et al. | 303/3 |
| 2011/0316329 A1* | 12/2011 | Nishino et al. | 303/14 |
| 2012/0053803 A1* | 3/2012 | Ueno | 701/70 |
| 2012/0091787 A1* | 4/2012 | Nishino et al. | 303/14 |
| 2012/0161506 A1* | 6/2012 | Tanaka et al. | 303/14 |
| 2013/0025273 A1* | 1/2013 | Nozawa et al. | 60/545 |

FOREIGN PATENT DOCUMENTS

| | | |
|---|---|---|
| JP | 2003-19952 | 1/2003 |
| JP | 2009-51432 | 3/2009 |
| JP | 2009-154814 | 7/2009 |

* cited by examiner

BRAKE CONTROL APPARATUS

TECHNICAL FIELD

The present invention relates to a brake control apparatus for operating a hydraulic brake apparatus by means of an electric motor.

BACKGROUND ART

For example, as described in PTL 1, in a brake apparatus for vehicle, there is known a brake control apparatus that generates a braking force on the vehicle, in which a brake hydraulic pressure is generated by means of an electric motor depending on an operation on a brake pedal, and an action of the electric motor is controlled based on the brake hydraulic pressure detected by a hydraulic pressure sensor, to thereby feed the brake hydraulic pressure to a wheel cylinder of each of wheels. Then, in a hydraulic brake system, due to a wear, a thermal expansion, and the like of a lining pressed by the wheel cylinder, rigidity of the wheel cylinder with respect to the brake hydraulic pressure, so-called hydraulic rigidity, changes. As described above, in the brake control apparatus, through application, based on the brake hydraulic pressure detected by the hydraulic pressure sensor, of feedback control to the action of the electric motor, even if the brake fluid amount to be fed to the brake apparatus during the braking is changed by the hydraulic rigidity, a constant brake hydraulic pressure is generated depending on a depressed amount of the brake pedal, to thereby obtain an appropriate braking force.

CITATION LIST

Patent Literature

PTL 1: JP 2009-154814 A

SUMMARY OF INVENTION

Technical Problem

The brake control apparatus described in PTL 1 above poses the following problem if the hydraulic pressure sensor fails.

If the hydraulic pressure sensor fails, through control, based on the depressed amount of the brake pedal, of a rotation position of the electric motor, the braking function is maintained even without the feedback of the brake hydraulic pressure from the hydraulic pressure sensor. However, in this case, the feedback of the brake hydraulic pressure cannot be provided, and if a change in hydraulic rigidity of the wheel cylinder causes a change in the brake fluid amount to be fed to the wheel cylinder during the braking, this change cannot be addressed. As a result, before and after the failure of the hydraulic pressure sensor, a characteristic of the braking force with respect to the depressed amount of the brake pedal, namely a characteristic of deceleration of the vehicle changes, resulting in a sense of discomfort in the operation of the brake pedal.

The present invention has an object to provide a brake control apparatus which can provide, even in the abnormal state of the hydraulic pressure sensor, the characteristic of the vehicle deceleration with respect to the operation amount of the brake pedal close to that in the normal state.

Solution to Problems

In order to solve the above-mentioned problem, the present invention provides a brake control apparatus, including:

an operation amount detector for detecting an operation amount of a brake pedal;

an electric motor for moving a piston of a master cylinder;

hydraulic pressure detector for detecting a brake hydraulic pressure in the master cylinder; and control means for setting, depending on the detection by the operation amount detector, a target hydraulic pressure of the master cylinder, and controlling, based on a detected value of the hydraulic pressure detector, an action of the electric motor so that the master cylinder attains the target hydraulic pressure, in which:

the control means connects to fluid amount detection means for detecting a value relating to a discharged fluid amount of the master cylinder; and the control means is configured to:

update, when the hydraulic pressure detector is normal, based on the detected value by the hydraulic pressure detector and a detection result by the fluid amount detection means, a brake characteristic representing a relationship between the brake hydraulic pressure of the master cylinder and the value relating to the discharged fluid amount; and calculate, when the hydraulic pressure detector is abnormal, by using the brake characteristic, a value relating to a target discharged fluid amount corresponding to the target hydraulic pressure of the master cylinder, and control the action of the electric motor so that the detected value by the fluid amount detection means attains the value relating to the target discharged fluid amount.

Advantageous Effects of Invention

According to the a brake control apparatus of the present invention, even in the abnormal state of the hydraulic pressure sensor, the characteristic of the vehicle deceleration with respect to the operation amount of the brake pedal close to that in the normal state can be obtained.

REFERENCE SIGNS LIST 1, 101 . . . brake control apparatus, 2, 102 . . . master cylinder, 6, 161 . . . controller (control means), 7 . . . piston, 10, 172 . . . hydraulic pressure sensor (a hydraulic pressure detector), 14, 140 . . . electric motor, 36, 180 . . . stroke sensor (an operation amount detector), 37, 160 . . . resolver (a rotation position detector), B6 . . . learning processing module (fluid amount detection means), 110 . . . primary piston (booster piston), 132 . . . input piston

DESCRIPTION OF EMBODIMENTS

Figure 1:
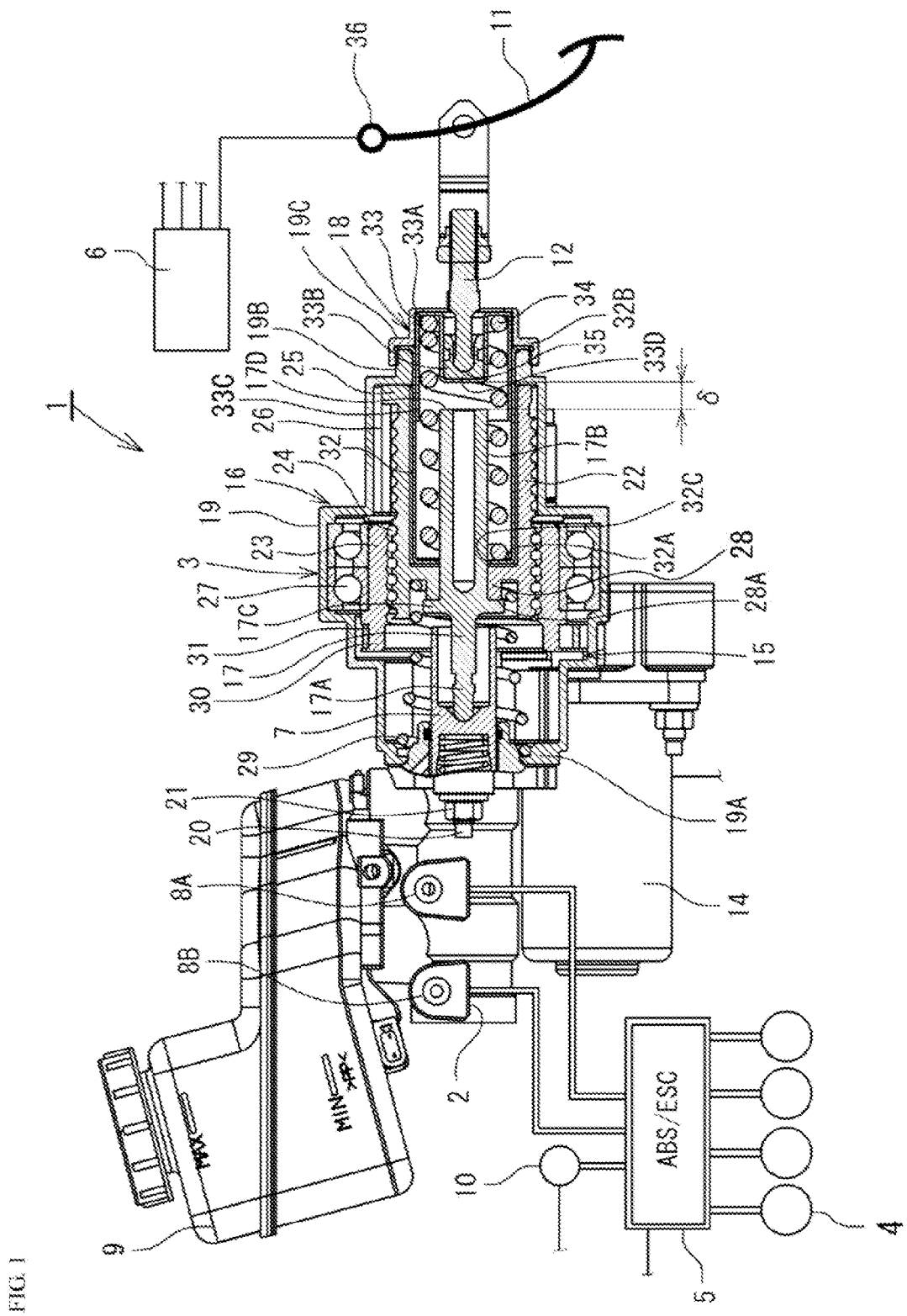
FIG. 1 is a diagram illustrating a schematic configuration of a brake control apparatus according to a first embodiment of the present invention.
Figure 2:
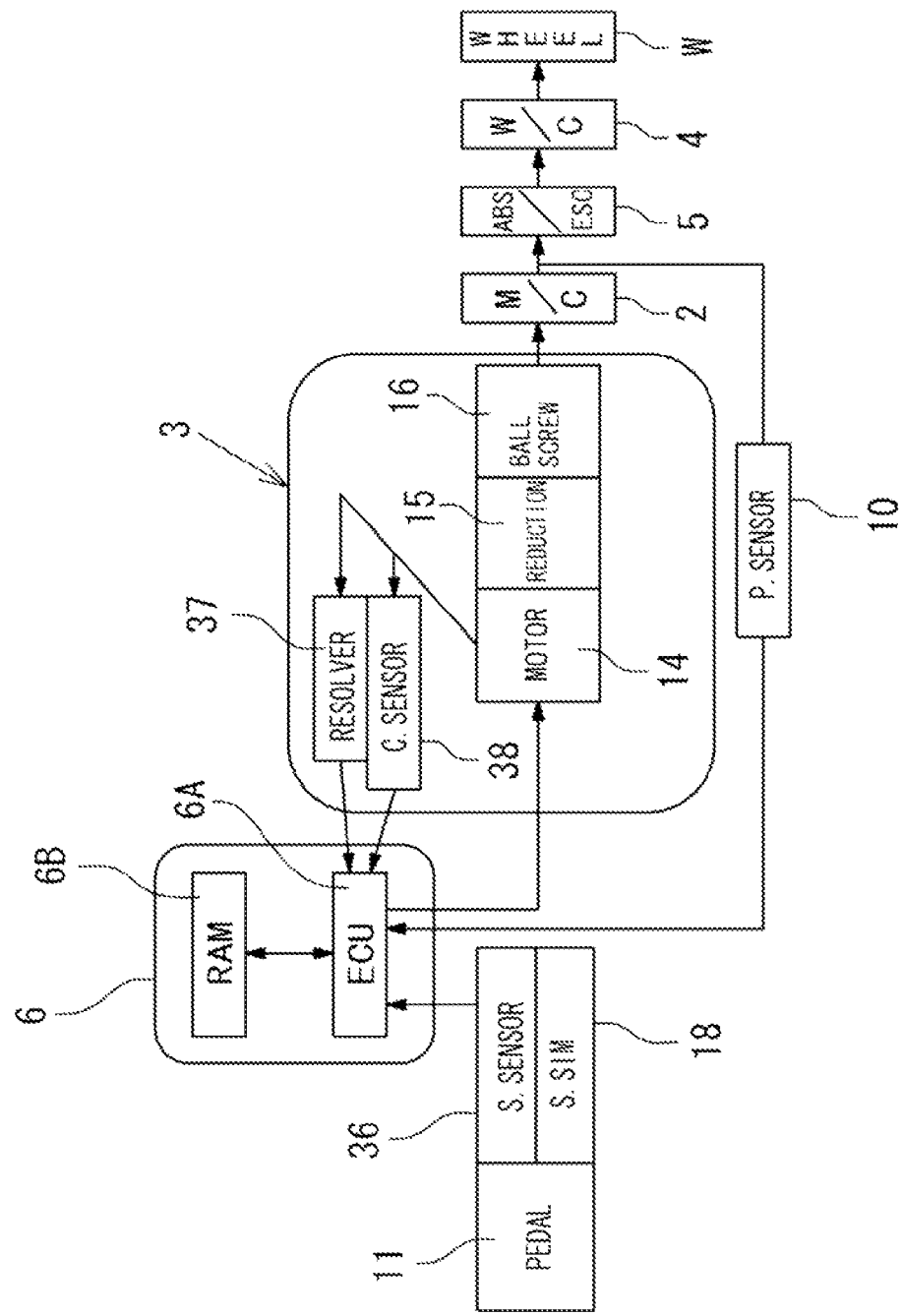
FIG. 2 is a block diagram illustrating a schematic configuration of the brake control apparatus of FIG. 1.

A detailed description is now given of embodiments of the present invention referring to drawings. Referring to FIGS. 1 to 6, a description is given of a first embodiment of the present invention. As illustrated in FIGS. 1 and 2, a brake control apparatus 1 according to this embodiment is a brake control apparatus for a vehicle such as a motor vehicle, and includes a master cylinder 2 for generating a brake hydraulic pressure, a booster device 3 for operating the master cylinder 2, hydraulic wheel cylinders 4 connected to the master cylinder 2 for generating braking forces on respective wheels as a result of a feed of the brake hydraulic pressure, a hydraulic pressure control unit 5 interposed between the master cylinder 2 and the respective wheel cylinders 4, and a controller 6 (control means) for controlling actions of the booster device 3 and the hydraulic pressure control unit 5.

The master cylinder 2 is of the tandem type, and includes a pair of pistons 7 having primary and secondary pistons serially arranged (only the primary side is illustrated). When these pistons 7 move forward, the same brake hydraulic pressure is fed from two hydraulic pressure ports 8A and 8B, and when the pistons 7 move backward, a brake fluid is properly supplemented from a reservoir 9 depending on wears of brake pads. As a result, even if one of the two systems of the hydraulic circuit fails, the hydraulic pressure is fed to the other system, and the braking function can thus be maintained.

The wheel cylinder 4 is installed on each of the wheels, is a braking device for generating the braking force as a result of the feed of the brake hydraulic pressure, and can be, for example, a publicly known disk brake or drum brake.

The hydraulic pressure control unit 5 includes the two systems of the hydraulic circuit connected to the two hydraulic pressure ports 8A and 8B of the master cylinder 2. The hydraulic circuit includes an electric pump serving as a hydraulic pressure source, an accumulator, and electromagnetic valves such as a pressure increasing valve and a pressure reducing valve. Moreover, to one system out of the two systems of the hydraulic circuit, a hydraulic pressure sensor 10 for detecting the brake hydraulic pressure generated by the master cylinder 2 is connected. Then, by a hydraulic pressure controller (not shown), a pressure decreasing mode for decreasing the hydraulic pressure fed to the wheel cylinders 4 of the respective wheels, a hold mode for holding the hydraulic pressure, and a pressure increasing mode for increasing the hydraulic pressure are properly executed to provide the following control.

(1) Braking force distribution control for properly distributing, by controlling the braking forces on the respective wheels, depending on ground contact weights during the braking and the like, the braking forces to the respective wheels.

(2) Anti-lock brake control for preventing, by automatically adjusting the braking forces on the respective wheels during the braking, the wheels from being locked.

(3) Vehicle stability control for stabilizing, by detecting skids of the wheels during the travel, and properly and automatically imparting the braking forces to the respective wheels, thereby restraining the understeer and the oversteer, behaviors of the vehicle.

(4) Hill start assisting control for assisting start by holding a braking state on a hill (particularly on an uphill).

(5) Traction control for preventing, during the start and the like, the wheels from slipping.

(6) Vehicle following control for maintaining a constant distance to a preceding vehicle, and lane departure prevention control for keeping a traveling lane.

(7) Obstacle avoidance control for avoiding a collision against an obstacle.

The booster device 3 includes an input rod 12 coupled to a brake pedal 11, an electric motor 14 for driving the pistons 7 of the master cylinder 2, a ball screw mechanism 16 which is a rotation-translation conversion mechanism driven via a belt transmission mechanism 15 by the electric motor 14, a pressing member 17 propelled by the ball screw mechanism 16 to press the pistons 7, and a stroke simulator 18 which is a reaction force generation mechanism coupled to the input rod 12.

The ball screw mechanism 16, the pressing member 17, and the stroke simulator 18 are arranged coaxially, and are stored in a housing 19 having an approximately cylindrical shape. To one end portion 19A of the housing 19, the master cylinder 2 is coupled by means of a stud bolt 20 and a nut 21. Moreover, from the other end portion 19B of the housing 19, the input rod 12 is protruded. The electric motor 14 is arranged at a side portion of the ball screw mechanism 16, and is coupled to the housing 19.

The pressing member 17 is arranged behind the pistons 7 and coaxially with the pistons 7, and a rod portion 17A having a rod shape inserted on a cylindrical rear end portion side of the pistons 7 for pressing the pistons 7, a cylinder portion 17B on the other end side, and a flange portion 17C arranged therebetween and having a large diameter are integrally formed.

The ball screw mechanism 16 has a hollow structure including a cylindrical translation member 22, a cylindrical rotation member 23 into which the translation member 22 is inserted, and balls 24 (steel balls) which are a plurality of rolling members filled in a spiral screw groove formed therebetween. The translation member 22 is supported for traveling in the axial direction in the housing 19, and is supported so as not to rotate about the axis by a rotation stopping portion 25 protruded outward in the radial direction engaging with a guide groove 26 formed on the housing 19. The rotation member 23 is supported by a bearing 27 in the housing 19 so as to rotate about the axis, and so as not to axially move. Then, by rotating the rotation member 23, the balls 24 roll in the screw groove, resulting in an axial movement of the translation member 22.

Into the translation member 22, the cylindrical portion 17B and the flange portion 17C of the pressing member 17 are inserted. Specifically, inside the translation member 22, a guide portion 28 is formed as a guide extending inward in the radial direction, and forming an annular shape. By the guide portion 28, the cylindrical portion 17B of the pressing member 17 is supported for sliding in the axial direction. Against an axial end surface portion 28A, which is a surface of the guide portion 28 opposed to the pistons 7, the flange portion 17C of the pressing member 17 abuts. As a result of the abutment against each other, the translation member 22 moves forward to the master cylinder 2 side, thereby pressing the flange portion 17C, the pressing member 17 moves forward along with the translation member 22, and the rod portion 17A presses the pistons 7 of the master cylinder 2. Moreover, separation of the flange portion 17C from the translation member 22 allows the pressing member 17 to move forward without accompanying the movement of the translation member 22. Between the one end portion 19A of the housing 19 and the translation member 22, a return spring 29, which is a compression coil spring in a tapered shape, is interposed. The return spring 29 is always energizing the translation member 22 toward the other end portion 19B side of the housing 19, the brake pedal 11 side, or backward.

On a front end portion side of the rotation member 23, a pulley 30 is integrally formed, and, on the pulley 30 and a pulley (not shown) mounted on an output shaft of the electric motor 14, a belt 31 is wound. With those, the belt transmission mechanism 15 is constructed, and the rotation member 23 is rotationally driven by the electric motor 14. Note that, with the belt transmission mechanism 15, a speed reduction mechanism such as a gear speed reduction mechanism may be combined. In place of the belt transmission mechanism 15, another publicly known transmission mechanism such as a gear transmission mechanism or a chain transmission mechanism may be used. Moreover, without interposing the transmission mechanism, by the electric motor 14, the rotation member 23 may be directly driven.

The electric motor 14 can be, for example, a publicly known DC motor, DC blushless motor, AC motor, or the like, and, from viewpoints of control, silence, durability, and the like, according to this embodiment, a DC blushless motor is adopted.

The stroke simulator 18 is arranged on a rear end portion side of the translation member 22, namely inside the end portion on the brake pedal side, and is fixed by a cap 19C attached to the other end portion 19B, which is the rear end portion of the housing 19, in the housing 19. The stroke simulator 18 includes a guide member 32 having a cylindrical shape with a bottom, a movable member 33 having a cylindrical shape with a bottom and arranged inside the guide member 32 to axially slide, and a reaction force spring 34, which is a compression coil spring interposed between a bottom portion 32A of the guide member 32 and a bottom portion 33A of the movable member 33.

The bottom portion 32A of the guide member 32 is inserted from the rear portion of the cylindrical translation member 22 into the inside thereof, and, while an outside flange portion 32B formed on an open end portion is in contact with the other end portion 19B of the housing 19, is fixed by the cap 19C to the housing 19. Into the guide member 32, from an opening 32C of the bottom portion 32A thereof, the rear end portion side of the cylindrical portion 17B of the pressing member 17 is inserted, the cylindrical portion 17B extends inside the guide member 32, and the pressing member 17 and the stroke simulator 18 are arranged so as to axially overlap. In detail, a part in the axial direction of an outer peripheral surface of the cylindrical portion 17B of the pressing member 17 and a part in the axial direction of an inner peripheral surface of the guide member 32 of the stroke simulator 18 are arranged so as to be opposed to each other, or, along the radial direction of the cylindrical portion 17B of the pressing member 17 and the guide member 32 of the stroke simulator 18, the thickness of the cylindrical portion 17B and the thickness of the guide portion 32 are arranged so as to overlap while a gap is provided therebetween. Further, in a relationship in arrangement between the cylindrical portion 17B of the pressing member 17 and the reaction force spring 34, the reaction force spring 34 is arranged, in the radial direction of the cylindrical portion 17B and the guide member 32, between the cylindrical portion 17B and the guide member 32. As a result, a part in the axial direction of the outer peripheral surface of the cylindrical portion 17B and a part in the axial direction on a radially inner side of the reaction force spring 34 are arranged so as to be opposed to each other, or, along the radial direction of the cylindrical portion 17B and the reaction force spring 34, the thickness of the cylindrical portion 17B and the wire diameter of the reaction force spring 34 are arranged so as to overlap while a gap is provided therebetween.

On the movable member 33, a rod reception portion 33B, which is formed to protrude forward from the inner peripheral side of the bottom portion 33A, namely toward the bottom portion 32A of the guide member 32, is formed. Moreover, on the movable member 33, a sliding cylindrical portion 33C, which is formed to protrude forward from the outer peripheral side of the bottom portion 33A, namely toward the bottom portion 32A of the guide member 32, and has an outer peripheral surface sliding on the inner peripheral surface of the guide member 32, is formed. To the inside of the rod reception portion 33B, a rod reception member 35 is fit and fixed, and, to the rod reception member 35, a distal end portion of the input rod 12 is coupled. The rod reception portion 33B of the movable member 33 is arranged coaxially with the cylindrical portion 17B of the pressing member 17, and a rear end surface 17D of the cylindrical portion 17B and a distal end surface 33D of the rod reception portion 33B are opposed to each other inside the cylindrical translation member 22. The bottom portion 33A of the movable member 33 abuts against the cap 19C, and a retracted position of the movable member 33 is thus restricted by the cap 19C. Then, when the movable member 33 is in a non-braking position (most retracted position where the movable member 33 is in contact with the cap 19C), a predetermined gap δ is formed between the distal end surface 33D of the rod reception portion 33B and the rear end surface 17D of the cylindrical portion 17B of the pressing member 17.

Also referring to FIG. 2 as needed, to the booster device 3, various sensors including a stroke sensor 36 which is operation amount detector for the brake pedal 11, a resolver 37 (refer to FIG. 2) for detecting a rotation angle (motor rotation position) of the electric motor 14 (as a result, the rotation angle of the rotation member 23 of the ball screw mechanism 16, or the displacement of the translation member 22 can be detected), a current sensor 38 (refer to FIG. 2) for measuring a current (motor current) flowing through the electric motor 14, and a hydraulic pressure sensor 10 which is hydraulic pressure detector for detecting a brake hydraulic pressure in the master cylinder 2 are connected. The controller 6 is an electronic control unit based on a microprocessor including an ECU 6A and a RAM 6B (refer to FIG. 2), and controls, based on the detections by the above-mentioned various sensors, the action of the electric motor 14.

On this occasion, by the rotation position, which is a value detected by the resolver 37, a discharged fluid amount of the master cylinder 2 is determined, the resolver 37 corresponds to fluid amount detection means for detecting a value relating to a discharged fluid amount according to the present invention, and the rotation angle is the value relating to the discharged fluid amount.

The above-mentioned stroke sensor 36 only needs to be a sensor for detecting a translation of the brake pedal 11 or the input rod 12, or a turn of the brake pedal 11, and a stroke sensor or a rotation sensor such as a potentiometer and an encoder can be used. Further, as the operation amount detector, in place of the stroke sensor 36, with the use of a load sensor for detecting a tread force (operation force) on the brake pedal 11, the tread force on the brake pedal 11 may be considered as the operation amount. Moreover, as the sensor for detecting the motor rotation position, though the resolver 37 is mentioned as an example, the sensor is not limited to the resolver 37, and rotation detector such as an encoder may be used. Moreover, as described above, the hydraulic pressure sensor 10 is provided on the hydraulic pressure control unit 5, and is thus connected to the controller 6 via a communication line between the hydraulic pressure control unit 5 and the controller 6. Note that, the hydraulic pressure sensor 10 is not necessarily provided on the hydraulic pressure control unit 5, and may be provided on either one or both of the hydraulic pressure ports 8A and 8B of the master cylinder 2, or at a position facing a pressure chamber in the master cylinder 2. In this case, the hydraulic pressure sensor 10 may be directly connected to the controller 6.

During normal braking, when the brake pedal 11 is operated by the driver, the controller 6 detects the operation amount via the stroke sensor 36, and controls, based on the detected operation amount of the brake pedal 11 and depending on the detections by the resolver 37, the current sensor 38, and the hydraulic pressure sensor 10, the action of the electric motor 14. In other words, the controller 6 drives the ball screw mechanism 16 by the electric motor 14 via the belt transmission mechanism 15. The translation member 22 of the ball screw mechanism 16 moves forward toward the master cylinder 2 while resisting against the spring force of the return spring 29, thereby propelling the pressing member 17. The pressing member 17 presses the pistons 7, thereby generating a brake hydraulic pressure in the master cylinder 2. The generated brake hydraulic pressure is fed via the hydraulic pressure control unit 5 to the wheel cylinders 4 of the respective wheels, thereby braking the wheels W (refer to FIG. 2).

In this way, when the controller 6 drives the electric motor 14, the gap δ between the distal end surface 33D of the rod reception portion 33B of the movable member 33 and the rear end surface 17D of the cylindrical portion 17B of the pressing member 17 is maintained. Moreover, to the brake pedal 11, depending on the operation amount thereof, a constant reaction force by the spring force of the reaction force spring 34 of the stroke simulator 18 is imparted. As a result, the driver can generate, by adjusting the operation amount of the brake pedal 11 while feeling the reaction force imparted to the brake pedal 11, a desired braking force.

Moreover, the controller 6 can change a control amount of the electric motor 14 with respect to the operation amount of the brake pedal 11. For example, in a hybrid vehicle or an electric vehicle, during the so-called regenerative braking where, by rotations of wheels during deceleration, motors are driven, thereby recovering a kinetic energy as electric power, the controller 6 can execute regenerative cooperation control, by depressurizing, by an amount corresponding to the regenerative braking, the hydraulic pressure in the master cylinder 2, thereby obtaining a desired braking force. Also in this case, the distal end surface 33D of the rod reception portion 33B and the rear end surface 17D of the cylindrical portion 17B of the pressing member 17 do not abut against each other, and the gap δ, though not a constant amount, is maintained. In this case, even if the hydraulic pressure of the master cylinder 2 changes by the mount corresponding to the regenerative braking, the deceleration of the vehicle depends on the operation amount of the brake pedal 11, and the reaction force on the brake pedal 11 imparted by the reaction force spring 34 of the stroke simulator 18 does not make the driver feel a sense of discomfort.

If, due to a failure in the electric motor 14, the controller 6, the ball screw mechanism 16, or the like, the control of the electric motor 14 is disabled, even when the driver operates the brake pedal 11, the electric motor 14 does not act, and the translation member 22 of the ball screw mechanism 16 does not move forward. As a result, when the brake pedal 11 is operated, the distal end surface 33D of the rod reception portion 33B of the movable member 33 abuts against the rear end surface 17D of the cylindrical portion 17B of the pressing member 17. In the abutment state, when the brake pedal 11 is further depressed, the rod reception portion 33B of the movable member 33 directly presses the cylindrical portion 17B, the flange portion 17C is separated from the end portion of the translation member 22, the pressing member 17 moves forward, and the rod portion 17A presses the pistons 7 of the master cylinder 2. In this way, only by the operation on the brake pedal 11, the pistons 7 can be moved forward, and the hydraulic pressure can be generated in the master cylinder 2, thereby maintaining the braking function. On this occasion, the pressing member 17 can move forward with respect to the translation member 22, the spring force of the return spring 29 does not act on the brake pedal 11, and, without an additional tread force, the brake pedal 11 can be operated.

A more detailed description is now given of the control of the electric motor 14 of the booster device 3 by the controller 6. The controller 6 monitors a state of the hydraulic pressure sensor 10, and switches the control between a normal state and an abnormal state of the hydraulic pressure sensor 10, thereby maintaining the control of the electric motor 14 during the abnormal state. On this occasion, the abnormality of the hydraulic pressure sensor 10 refers to, in addition to a case where the hydraulic pressure sensor 10 itself fails, a case where, due to a failure of the hydraulic pressure control unit 5 to which the hydraulic pressure sensor 10 is connected, a failure of the communication line between the hydraulic pressure control unit 5 and the controller 6, and the like, the detection signal of the hydraulic pressure sensor 10 cannot be obtained.

(Normal State of Hydraulic Pressure Sensor)

Figure 3:
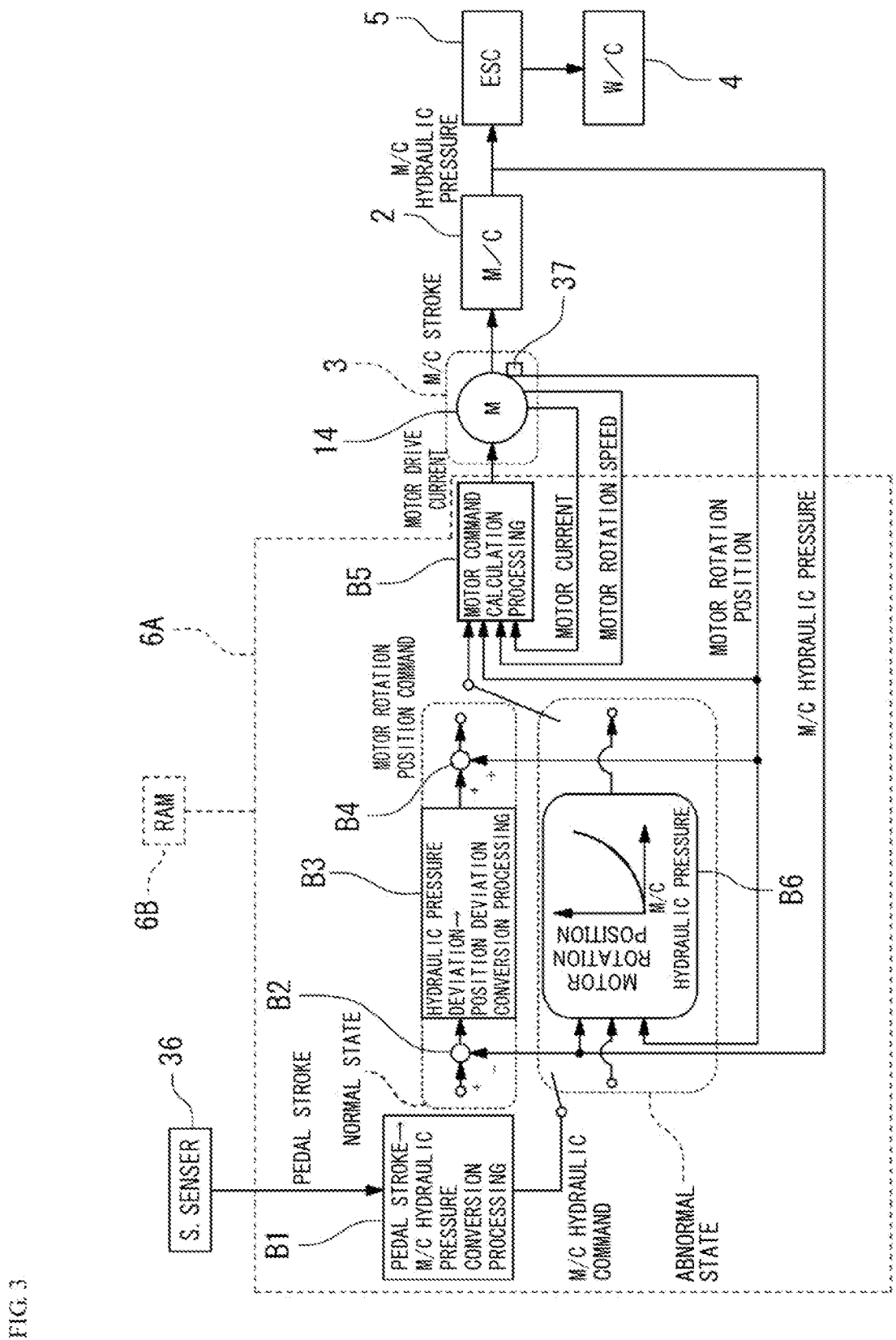
FIG. 3 is a block diagram illustrating control of an electric motor by a controller of the brake control apparatus of FIG. 1.

Referring to FIG. 3, a description is given of the control by the controller 6 in the normal state of the hydraulic pressure sensor 10. When the brake pedal 11 is operated and the brake pedal operation amount (brake pedal stroke) is input from the stroke sensor 36, a pedal stroke-master cylinder hydraulic pressure conversion processing module B1 in the ECU 6A of the controller 6 converts the input brake pedal stroke into a master cylinder hydraulic pressure command, which is a target hydraulic pressure. On this occasion, the master cylinder hydraulic pressure command is obtained from table information storing a characteristic of the master cylinder hydraulic pressure corresponding to the brake pedal stroke stored in the RAM 6B in advance. Then, a hydraulic pressure deviation calculation module B2 calculates a hydraulic pressure deviation by subtracting the master cylinder hydraulic pressure detected by the hydraulic pressure sensor 10 from the master cylinder hydraulic pressure command. The hydraulic pressure deviation is converted into a position deviation by a master cylinder hydraulic pressure-motor rotation position conversion processing module B3 using a conversion coefficient stored in advance in the RAM 6B. Then, a motor rotation position command calculation module B4 calculates a motor rotation position command by adding the position deviation to the motor rotation position detected by the resolver 37. A motor command calculation processing module B5 calculates, based on the motor rotation position command, the motor rotation position detected by the resolver 37, the motor rotation speed, and the motor current detected by the current sensor 38, a motor drive current for driving the electric motor 14, and supplies the electric motor 14 with the motor drive current. As a result, the electric motor 14 is activated, and moves the pistons 7 of the master cylinder 2 forward to generate the brake hydraulic pressure and supply the wheel cylinders 4 with the brake hydraulic pressure until the target hydraulic pressure is attained, thereby providing the braking depending on the operation amount of the brake pedal 11.

On this occasion, the motor rotation position of the electric motor 14 changes in response to the brake hydraulic pressure in the master cylinder 2. In other words, even if the motor rotation positions are the same, a change in hydraulic rigidity on the wheel cylinders 4 side due to wears of the brake pads, thermal expansions of brake devices, and the like changes the brake hydraulic pressure in the master cylinder 2. Therefore, in order to prepare for a failure in the hydraulic pressure sensor 10, which is to be described later, while the hydraulic pressure sensor 10 is normal, a brake characteristic representing a relationship between the motor rotation position detected by the resolver 37 and the master cylinder hydraulic pressure detected by the hydraulic pressure sensor 10 is stored and updated by a learning processing module B6 (fluid amount detection means) in the RAM 6B. A method of storing the brake characteristic may include plotting detection results at points (motor rotation positions or master cylinder hydraulic pressures) set in advance, or storing directly the detection results. Then, the stored relationship between the motor rotation position and the master cylinder hydraulic pressure is updated as appropriate.

On this occasion, according to this embodiment, a pressure reception area M of the pistons 7 is constant, and the discharged fluid amount is a product of the pressure reception area M and a displacement amount of the pistons 7, namely the motor rotation position. Therefore, the motor rotation position represents the position (stroke) of the pistons 7, and further represents the brake fluid amount fed from the master cylinder 2 to the wheel cylinders 4, which is obtained by multiplying the stroke of the pistons 7 by the pressure reception area M of the pistons 7, namely the discharged fluid amount of the master cylinder 2. Thus, the brake characteristic representing the relationship between the motor rotation position and the master cylinder hydraulic pressure represents the relationship between the master cylinder hydraulic pressure and the discharged fluid amount of the master cylinder 2. Therefore, according to this embodiment, in order to simplify the calculation, based on the motor rotation position, which is a value relating to the discharged fluid amount of the master cylinder and the master cylinder hydraulic pressure, the brake characteristic is calculated.

The update of the brake characteristic can be carried out by any one of the following methods, for example. As shown in FIG. 4(A), by directly changing a current brake characteristic C to a detected brake characteristic C', the update is carried out. As shown in FIG. 4(B), with respect to the current brake characteristic C, based on a plot P of the detected brake characteristic, a change is made by a certain rate by using a learning coefficient representing a degree of update set in advance, thereby carrying out an update to a brake characteristic C'. Moreover, as illustrated in FIG. 4(C), in consideration of a detection accuracy of the sensor, a learning coefficient representing the degree of update is determined, and an update to the calculated brake characteristic C' is carried out. Alternatively, another publicly known technology may be used for the update.

Moreover, an area outside the extent of the motor rotation position and the master cylinder hydraulic pressure detected during the braking described above is updated by carrying out as appropriate interpolation processing, for example, as follows. As shown in FIG. 5(A), by moving the current brake characteristic C based on plots P1, P2, P3, and P4 of a detection result, thereby carrying out the interpolation, the brake characteristic C' for the update is generated. Moreover, as shown in FIG. 5(B), with respect to the current brake characteristic C, based on the plots P1, P2, P3, and P4 of the detection result, one characteristic may be selected, as the brake characteristic C' for the update, from a plurality of brake characteristics C1, C2, C3, . . . set in advance.

(Abnormal State of Hydraulic Pressure Sensor)

Referring to FIG. 3, a description is now given of control by the controller 6 if, due to a failure of the hydraulic pressure sensor 10 or the like, the master cylinder hydraulic pressure cannot be detected, namely in the abnormal state of the hydraulic pressure sensor 10. The master cylinder hydraulic pressure command obtained by the conversion by the pedal stroke-master cylinder hydraulic pressure conversion processing module B1 depending on the brake pedal operation amount is input to the learning processing module B6. The learning processing module B6 converts, by using the brake characteristic representing the relationship between the master cylinder hydraulic pressure and the motor rotation position stored and updated in the RAM 6B when the hydraulic pressure sensor 10 is normal, the input master cylinder hydraulic pressure command into the motor rotation position command (value relating to a target discharged fluid amount), and inputs the motor rotation position command into the motor command calculation module B5. Subsequently, through execution of the same processing as that when the hydraulic pressure sensor is normal, thereby controlling the electric motor 14, the braking is carried out by the wheel cylinders 4 so that the motor rotation position (value relating to the discharged fluid amount) reaches the motor rotation position command (value relating to the target discharged fluid amount). As a result, when, due to a failure of the hydraulic pressure sensor 10 or the like, the master cylinder hydraulic pressure information cannot be obtained, the braking force control corresponding to the hydraulic rigidity of the wheel cylinders 4 before the failure of the hydraulic pressure sensor 10 or the like occurs can be carried out. In the abnormal state of the hydraulic pressure sensor, the hydraulic pressure control by the hydraulic pressure control unit 5 is not carried out, and the master cylinder hydraulic pressure is directly fed to the wheel cylinders 4.

In this case, in the normal state of the hydraulic pressure sensor 10, the learning processing module B6 updates the brake characteristic as needed, and when the control method is switched due to abnormality of the hydraulic pressure sensor 10, even if the characteristic of the wheel cylinders 4 has been changed by a temperature change due to a frictional heat, a change in the hydraulic rigidity due to the wear state of the brake pads, and the like, the vehicle deceleration with respect to the brake operation can be prevented from fluctuating, thereby reducing the sense of discomfort of the driver before and after the failure of the hydraulic pressure sensor 10. Then, in the abnormal state of the hydraulic pressure sensor 10, by means of a warning light, a warning sound, and the like, the driver is warned of the abnormality of the hydraulic pressure sensor 10, and the driver is prompted to check and repair the vehicle.

The determination on whether the hydraulic pressure sensor 10 is normal or abnormal can be made depending on whether or not a power supply voltage for the hydraulic pressure sensor 10 is within an appropriate range, or whether or not an output signal of the hydraulic pressure sensor 10 is within a predetermined appropriate range (for example, whether or not the output signal is fixed to the maximum value or the minimum value, or whether or not the output signal is extremely displaced from the master cylinder hydraulic pressure corresponding to the pedal stroke detected by the stroke sensor 36 based on the brake characteristic stored in the RAM 6B), or by other publicly known technologies.

Figure 6:
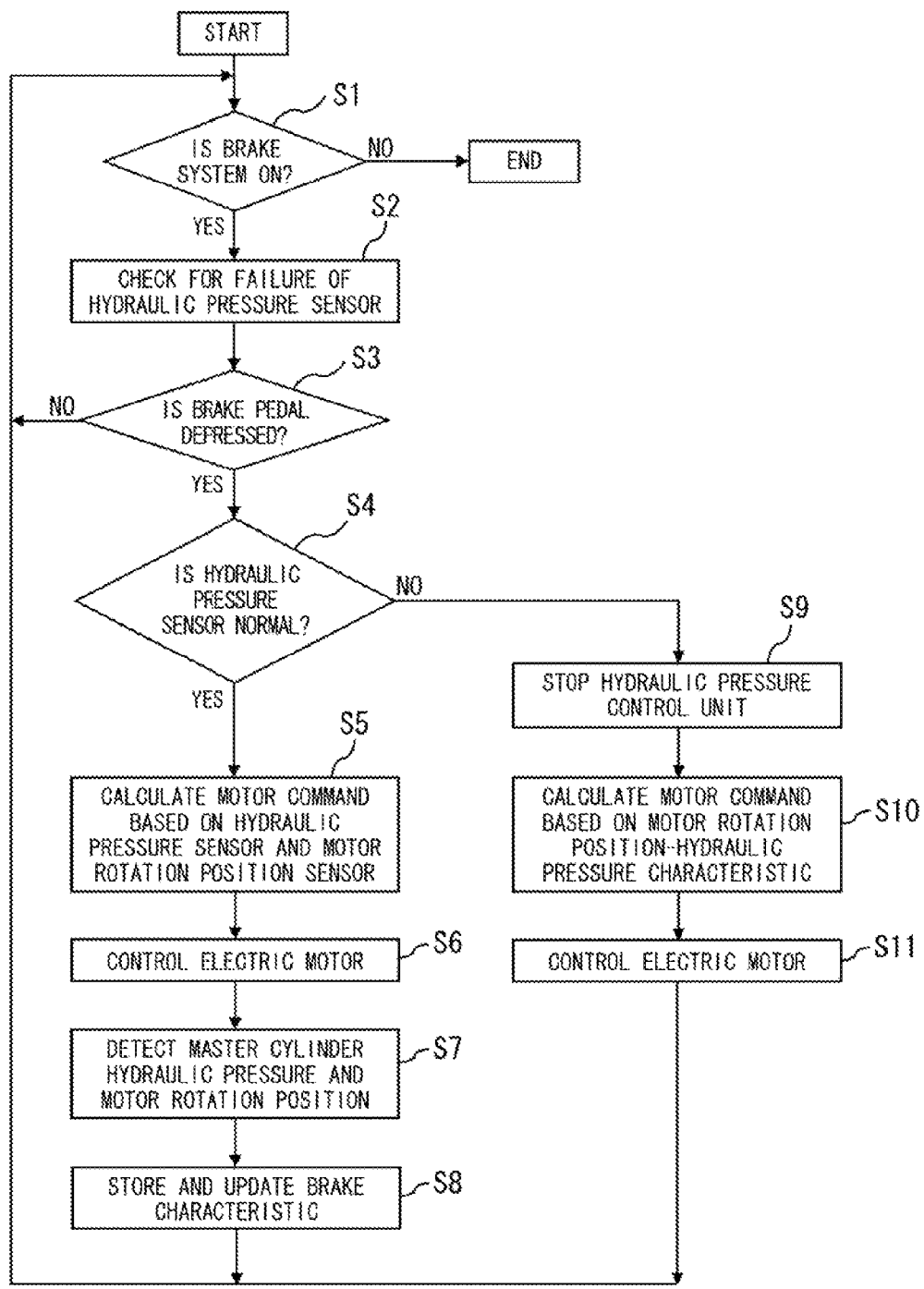
FIG. 6 is a flowchart illustrating the control of the electric motor by the controller of the brake control apparatus of FIG. 1.

Referring to FIG. 6, a description is now given of an example of a control flow for executing, by the controller 6, the above-mentioned brake control. Referring to FIG. 6, in Step S1, the controller 6 determines whether or not the brake system is on, and when the brake system is on, the processing proceeds to Step S2 in which the controller 6 checks for a failure of the hydraulic sensor 10. The controller 6 determines, by means of the above-mentioned method, whether the hydraulic pressure sensor 10 is normal or abnormal, and stores a result thereof, and the processing proceeds to Step S3. In Step S3, the controller 6 determines whether or not the brake pedal 11 is depressed. When the brake pedal 11 is depressed, the processing proceeds to Step S4, and when the brake pedal 11 is not depressed, the processing returns to Step S1.

In Step S4, based on the failure check in Step S2, the controller 6 determines whether or not the hydraulic pressure sensor 10 is normal. When the hydraulic pressure sensor 10 is normal, the processing proceeds to Step S5, and when the hydraulic pressure sensor 10 is not normal, the processing proceeds to Step S9. In Step S5, the controller 6 calculates, based on the detections by the various sensors including the hydraulic pressure sensor 10 and the resolver 37 (motor rotation position sensor), by executing the processing in the normal state in FIG. 3, the drive current for the electric motor 14, and the processing proceeds to Step S6. In Step S6, the controller 6 activates, by the drive current, the electric motor 14, thereby generating the brake hydraulic pressure in the master cylinder 2, and feeds the brake hydraulic pressure via the hydraulic pressure control unit 5 to the wheel cylinders 4, thereby generating the braking forces, and the processing proceeds to Step S7. In Step S7, the controller 6 detects the motor rotation position by means of the resolver 37 and detects the master cylinder hydraulic pressure by means of the hydraulic pressure sensor 10, and the processing proceeds to Step S8. In Step S8, the controller 6 controls, based on the motor rotation position and the master cylinder hydraulic pressure detected in Step S7, the learning processing module B6 to store and update the brake characteristic.

On the other hand, when, in Step S4, the controller 6 determines that the hydraulic pressure sensor 10 is not normal (abnormal) and the processing proceeds to Step S9, the controller 6 stops, in Step S9, the action of the hydraulic pressure control unit 5, and the processing proceeds to Step S10. In Step S10, the controller 6 executes processing for the abnormal state in FIG. 7, determines the motor rotation position command based on the master cylinder hydraulic pressure command by using the brake characteristic updated by the learning processing module B6, and controls the motor command calculation processing module B5 to calculate the motor drive current, and the processing proceeds to Step S11. In Step S11, the controller 6 activates the electric motor 14 by the drive current, thereby generating the hydraulic pressure in the master cylinder 2, and feeds the hydraulic pressure via the hydraulic pressure control unit 5 to the wheel cylinders 4, thereby generating the braking forces. As a result, when the hydraulic pressure sensor 10 is abnormal, the electric motor 14 is controlled based on the brake characteristic leaned and updated when the hydraulic pressure sensor 10 is normal, and the change in a variation characteristic of the vehicle deceleration with respect to the brake operation is restrained, thereby reducing the sense of discomfort of the driver before and after the failure of the hydraulic pressure sensor 10.

In the brake control apparatus according to the above-mentioned first embodiment, the controller 6 stores and updates, in the normal state, based on the detection results by the hydraulic pressure sensor 10 and the resolver 37, the brake characteristic representing the relationship between the hydraulic pressure of the master cylinder 2 and the rotation position of the electric motor 14, and, in the abnormal state of the hydraulic pressure sensor 10, controls, by using the updated brake characteristic described above, based on the detection result by the resolver 37, the action of the above-mentioned electric motor so that the rotation position of the electric motor 14 attains the value corresponding to the target hydraulic pressure of the above-mentioned master cylinder. The above-mentioned brake control apparatus can provide the brake control without the need for another hydraulic pressure sensor even if a failure of the hydraulic pressure sensor or the like occurs, and can increase flexibility of the system while reliability as the system is ensured. According to this embodiment, the brake characteristic representing the relationship between the hydraulic pressure in the master cylinder and the value relating to the discharged fluid amount is generated and updated as the brake characteristic representing the relationship between the hydraulic pressure in the master cylinder 2 and the rotation position of the electric motor 14, but the brake characteristic may be generated and updated as a brake characteristic representing a relationship between the discharged fluid amount of the master cylinder, which is the product of the rotation position of the electric motor 14 and the pressure reception area M of the piston 7, and the hydraulic pressure of the master cylinder 2.

Figure 9:
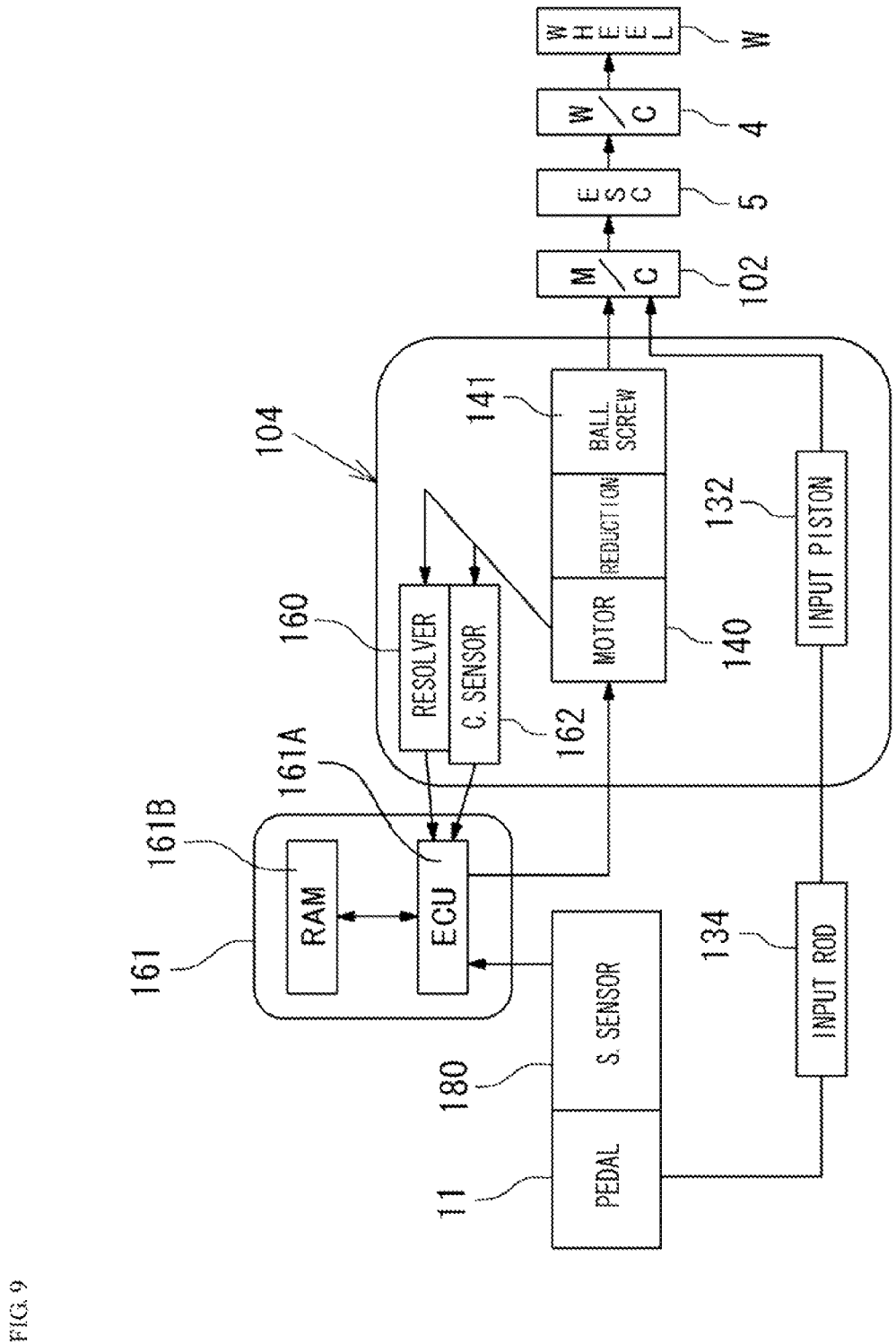
FIG. 9 is a block diagram illustrating a schematic configuration of the brake control apparatus of FIG. 8.

Referring to FIG. 9, a description is now given of an example of a method of determining the brake characteristic used in the abnormal state of the hydraulic pressure sensor 10 according to the first embodiment described above. The temperature of the wheel cylinders 4 is increased by the frictional heat during the braking, and the brake characteristic changes depending on the usage state such as a magnitude of the brake hydraulic pressure command and a braking period. Thus, a heat quantity Q accumulated in the wheel cylinders 4, which is obtained by subtracting a heat radiation quantity Qo of the wheel cylinders 4 from a heat quantity Qi generated by the frictional heat during the braking, is considered as a function Q(t) of the time t, and, based on the heat quantity Q(t), the brake characteristic is determined.

$$Q(t) = \int Q_i \cdot dt - \int Q_o \cdot dt$$

Figure 7:
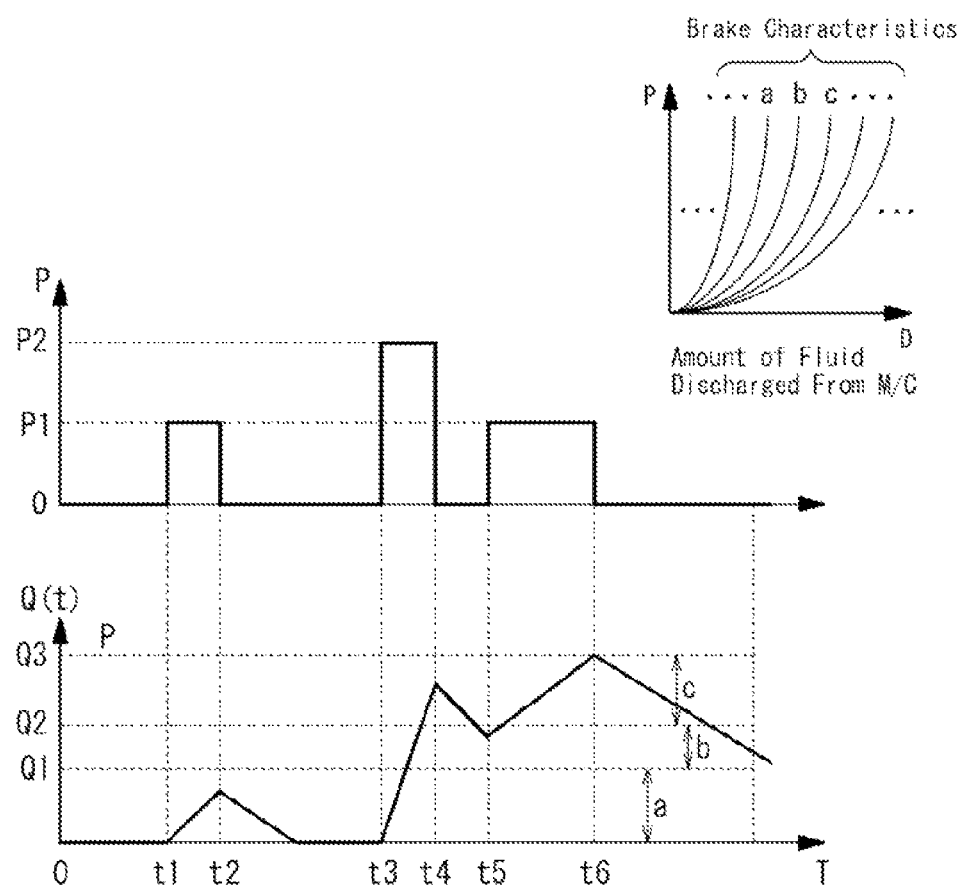
FIG. 7 is a time chart illustrating a method of selecting the brake characteristic stored and updated by the controller in the brake control apparatus according to the first embodiment.

Referring to FIG. 7, corresponding to different heat quantities Q(t), a plurality of brake characteristics a, b, c, . . . are set in advance, and a brake characteristic to be used is selected depending on the usage state, that is, the command hydraulic pressure and the braking period. In the illustrated example, a case where in a period from a time t1 to a time t2, a hydraulic pressure P1 is commanded, in a period from a time t3 to a time t4, a hydraulic pressure P2 is commanded, and in a period from a time t5 to a time t6, the hydraulic pressure P1 is commanded is illustrated. In this case, in an area where the heat quantity Q(t) is 0≤Q(t)<Q1, the brake characteristic a is used, in an area where the heat quantity Q(t) is Q1≤Q(t)<Q2, the brake characteristic b is used, and in an area where the heat quantity Q(t) is Q2≤Q(t)<Q3, the brake characteristic c is used. In the illustrated example, a characteristic of the heat quantity Q(t) is a linear characteristic where the gradient changes depending on the command hydraulic pressure. However, a different characteristic may be used, and another factor such as a worn amount of the brake pads may be added.

The brake characteristics a, b, c, . . . are changed by the wears of the brake pads and the like, and as described above, are leaned and updated based on the master cylinder hydraulic pressure detected by the hydraulic pressure sensor 10, the motor rotation position detected by the resolver 37, and the motor current detected by the current sensor 38 during the braking.

Then, when the abnormality of the hydraulic pressure sensor 10 is detected, by using a brake characteristic determined from the brake characteristics a, b, c, . . . depending on the heat quantity Q(t), the control when the hydraulic pressure sensor is abnormal is executed, resulting in the maintenance of the brake control and a reduction of the sense of discomfort caused by the switching in the control method. Moreover, the brake characteristic is changed depending on the usage state such as the magnitude of the brake hydraulic pressure command and the braking period. Therefore, even if the hydraulic rigidity on the wheel cylinders 4 side changes after a time has elapsed since the abnormality of the hydraulic pressure sensor 10 was detected, the brake control is maintained in response thereto, and the sense of discomfort caused by the switching in the control method is reduced.

Referring to FIGS. 8 to 13, a description is now given of a second embodiment of the present invention. In the following description, like components are denoted by like reference symbols as of the first embodiment described above, and a detailed description is only given of different portions.

Figure 8:
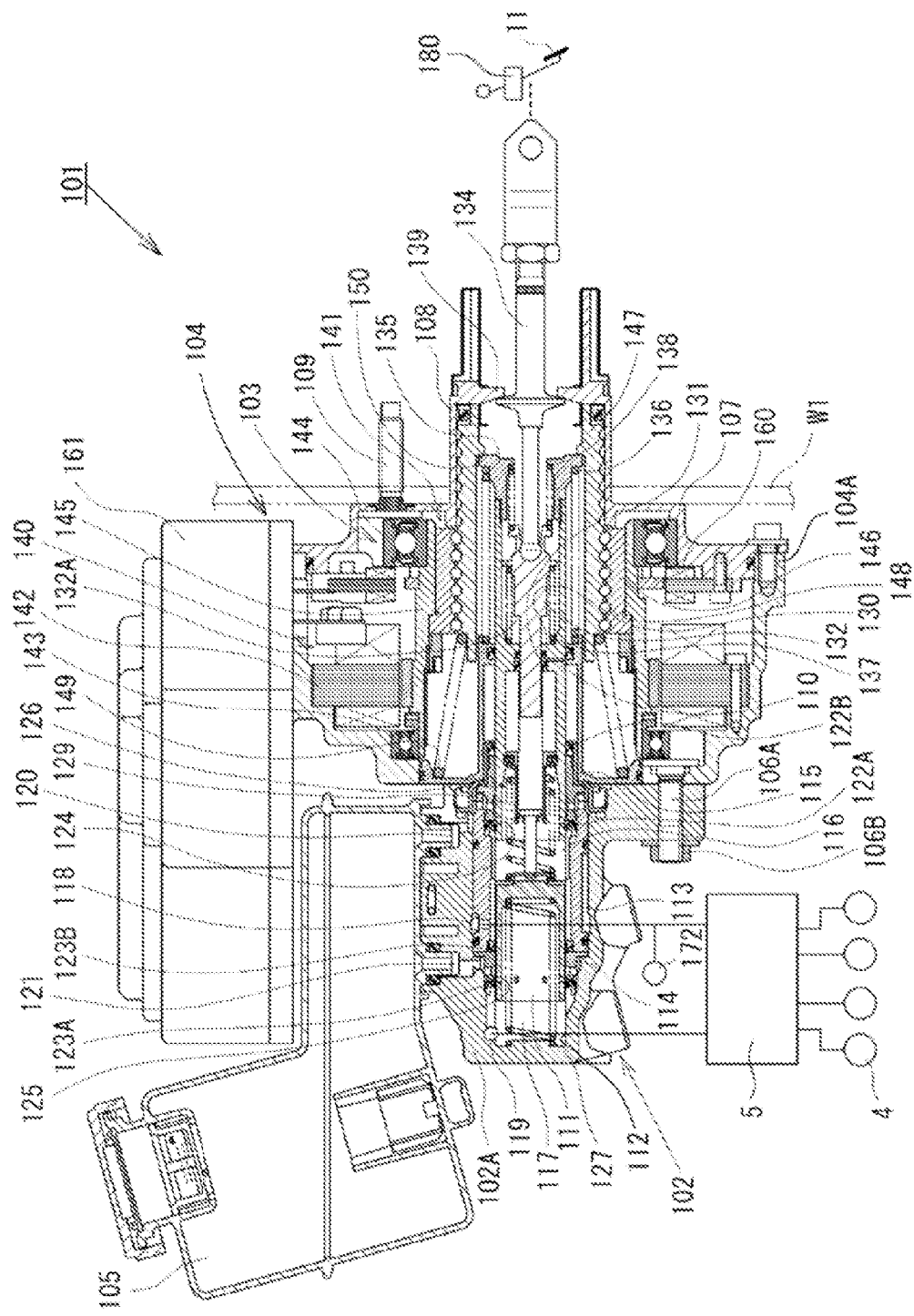
FIG. 8 is a diagram illustrating a schematic configuration of a brake control apparatus according to a second embodiment of the present invention.

As illustrated in FIGS. 8 and 9, a brake control apparatus 101 according to this embodiment includes a master cylinder 102 of the tandem type, and an electric booster device 104 for activating the master cylinder 102. To the master cylinder 102, a reservoir 105 is connected. The master cylinder 102 includes a cylinder body 102A having approximately a cylindrical shape with a bottom, and an opening portion side thereof is coupled to a front portion of a case 104A of the electric booster device by means of a stud bolt 106A and a nut 106B. On a top portion of the case 104A, a controller 161, which is control means, is attached. On a rear portion of the case 104A, a flat attachment seat surface 107 is formed, and from the attachment seat surface 107, a cylindrically shaped guide portion or a cylindrical portion 108 having a cylindrical shape concentric with the master cylinder 102 protrudes. Then, the brake control apparatus 101 is arranged inside an engine room of the vehicle, the guide portion 108 is extended through a bulkhead W1 between the engine room and a cabin into the cabin, the attachment seat surface 107 is in contact with the bulkhead W1, and the brake control apparatus 101 is fixed by using a stud bolt 109 provided on the attachment seat surface 107.

In the cylinder body 102A of the master cylinder 102, on the opening side, a cylindrical primary piston 110 serving as a booster piston, and having a distal end formed into a cup shape is fit, and on a bottom portion side, a secondary piston 111 in a cup shape is fit. A rear end portion of the primary piston 110 protrudes from the opening portion of the master cylinder 102 into the case 104A, and extends to a neighborhood of the guide portion 108. The primary piston 110 and the secondary piston 111 are guided for sliding by annular guide members 114 and 115 arranged on both end sides of a sleeve 113 fit into a cylinder bore 112 of the cylinder body 102A. In the cylinder body 102A, two pressure chambers including a primary chamber 116 and a secondary chamber 117 are formed by the primary piston 110 and the secondary piston 111. On the primary chamber 116 and the secondary chamber 117, hydraulic pressure ports 118 and 119 are respectively provided. The hydraulic pressure ports 118 and 119 are connected via the hydraulic pressure control unit 5 constructed by two systems of a hydraulic pressure circuit to wheel cylinders 4 of respective wheels.

On an upper side of a side wall of the cylinder main body 2A, reservoir ports 120 and 121 for connecting the primary chamber 116 and the secondary chamber 117 to the reservoir 105 are provided. Between the cylinder bore 112 of the cylinder body 102A and the primary piston 110, and between the cylinder bore 112 and the secondary piston 111, two seal members 122A and 122B, and two seal members 123A and 123B respectively provide sealing. The seal members 122A and 122B are provided in the axial direction on both sides of the reservoir port 120. Out thereof, the seal member 122A controls, when the primary piston 110 is at a non-braking position illustrated in FIG. 8, the primary chamber 116 to communicate via a port 124 provided on a sidewall of the primary piston 110 with the reservoir port 120. When the primary piston 110 moves forward from the non-braking position, the seal member 122A disconnects the primary chamber 116 from the reservoir port 120. Similarly, the seal members 123A and 123B are provided in the axial direction on both sides of the reservoir port 121. Out thereof, the seal member 123A controls, when the secondary piston 111 is at a non-braking position illustrated in FIG. 8, the secondary chamber 117 to communicate via a port 125 provided on a sidewall of the secondary piston 111 with the reservoir port 121. When the secondary piston 111 moves forward from the non-braking position, the seal member 123A disconnects the secondary chamber 117 from the reservoir port 121.

Between the primary piston 110 and the secondary piston 111 in the primary chamber 116, a spring assembly 126 is interposed. Moreover, between a bottom portion of the master cylinder 102 and the secondary piston 111 in the secondary chamber 117, a return spring 127, which is a compression coil spring, is interposed. The spring assembly 126 holds the compression coil spring, by a cylindrical retainer 129 which can extend and contract, in a predetermined compressed state, and can compress the compression coil spring against a spring force thereof.

The primary piston 110 includes the distal end portion in the cup shape, a cylindrical rear portion, and an intermediate wall 130 for axially partitioning an interior, and, through the intermediate wall 130, a guide bore 131 axially passes. Into the guide bore 131, a distal end portion having a small diameter of an input piston 132 having a stepped shape including a step portion 132A, which is an input member, is inserted for sliding in a liquid-tight manner, and the distal end portion of the input piston 132 is inserted into a cylindrical retainer 129 of the spring assembly 126 in the primary chamber 116, in other words, arranged so as to face the primary chamber 116, which is the pressure chamber. According to this embodiment, the pistons of the master cylinder include the primary piston 110, which being the booster piston, and the input piston 132.

To a rear end portion of the input piston 132, a distal end portion of an input rod 134 inserted into the cylindrical portion 108 of the case 104A and a rear portion of the primary piston 110 is coupled. A rear end side of the input rod 134 extends to the outside from the cylindrical portion 108, and, to the end portion thereof, a brake pedal 11 operated so as to issue a braking command is coupled. To the rear end portion of the primary piston 110, a spring seat 135 having a flange shape is attached. The primary piston 110 is energized, by a return spring 136, which is a compression coil spring interposed between a front wall side of the case 104A and the spring seat 135, toward a retraction direction. The input piston 132 is elastically held by springs 137 and 138 which are spring members interposed respectively between the input piston 132 and the intermediate wall 130 of the primary piston 110, and between the input piston 132 and the spring seat 135 in a neutral position illustrated in FIG. 8. The retracted position of the input rod 134 is prescribed by a stopper 139 provided on a rear end portion of the cylindrical portion 108 of the case 104A.

In the case 104A, an actuator 103 including an electric motor 140 and a ball screw mechanism 141 for converting the rotation of the electric motor 140 into a translational motion, thereby imparting a propelling force to the primary piston 110 is provided. The electric motor 140 includes a stator 142 fixed to the case 104A, and a hollow rotor 145, which is opposed to the stator 142 and is supported for rotation via bearings 143 and 144 by the case 104A. The ball screw mechanism 141 includes a nut member 146, which is a rotation member fixed to an inner peripheral portion of the rotor 145, a hollow screw shaft 147, which is a translation member inserted into the nut member 146 and the cylindrical portion 108 of the case 104A, movable along the axial direction, and supported so as not to rotate about the axis, and a plurality of balls 148 filled in a screw groove formed on opposing surfaces thereof. The ball screw mechanism 141 is configured so that, by the rotation of the nut member 146, the balls 148 are rolled along the screw groove, thereby moving the screw shaft 147 in the axial direction. Note that, the ball screw mechanism 141 can mutually convert the rotational motion and the translational motion between the nut member 146 and the screw shaft 147.

Note that, between the electric motor 140 and the ball screw mechanism 141, a publicly known speed reduction mechanism such as a planetary gear mechanism or a differential speed reduction mechanism may be interposed, thereby reducing the speed of the rotation of the electric motor 140, and then the rotation may be transmitted to the ball screw mechanism 141.

The screw shaft 147 of the ball screw mechanism 141 is energized by a return spring 149, which is a compression tapered coil spring interposed between the front wall side of the case 104A and the screw shaft 147, toward the retraction direction, and a retracted position thereof is restricted by a stopper 139 provided on the cylindrical portion 108 of the case 104A. Into the screw shaft 147, the rear end portion of the primary piston 10 is inserted, and against a step portion 150 formed on an inner peripheral portion of the screw shaft 47, the spring seat 135 abuts, thereby restricting a retracted position of the primary piston 110. As a result, the primary piston 10 moves forward along with the screw shaft 47, or separates from the step portion 50 and moves forward independently. Then, as illustrated in FIG. 8, the retracted position of the primary piston 110 is restricted by the step portion 150 of the screw shaft 147 which is abutting against the stopper 139, and the maximum length of the primary piston 110 in the retracted position and the spring assembly 126 restricts a retracted position of the secondary piston 111. The step portion 150 of the screw shaft 147 is arranged within an extent of the length in the axial direction of the nut member 146.

The brake control apparatus 101 includes a stroke sensor 180 for detecting a displacement of the brake pedal 11, thus displacements of the input piston 132 (input member) and the input rod 134, a resolver 160 as rotation position detector detecting a rotation position (namely, the position of the primary piston 110 coupled to the rotor 145) of the rotor 145 of the electric motor 140, a hydraulic pressure sensor 172 as hydraulic pressure detector for detecting hydraulic pressures in the primary chamber 116 and the secondary chamber 117, a current sensor 162 (refer to FIG. 9) for detecting a power supply current for the electric motor 40, and various sensors including those sensors. The controller 161 is an electronic control apparatus based on a microprocessor including an ECU 161A and a RAM 161B (refer to FIG. 9), and controls, based on detection signals from the various sensors, the rotation of the electric motor 140.

A description is now given of the action of the brake control apparatus 101. When the brake pedal 11 is operated, thereby moving, via the input rod 134, forward the input piston 132, the displacement of the input piston 132 is detected by the stroke sensor 180. The controller 161 determines, depending on the detected stroke by the stroke sensor 180, a target hydraulic pressure of the master cylinder 102, and controls the action of the electric motor 140 so as to attain the target hydraulic pressure. The electric motor 140 moves, by its action, via the ball screw mechanism 141, the primary piston 110 forward. As a result, the hydraulic pressure is generated in the primary chamber 116, and the hydraulic pressure is transmitted via the secondary piston 111 to the secondary chamber 117. Then, the feedback control of the electric motor 140 generates the brake hydraulic pressure in response to the operation amount on the brake pedal 11 in the master cylinder 102 so that the hydraulic pressure in the master cylinder 102 detected by the hydraulic pressure sensor 172 attains the target hydraulic pressure. The brake hydraulic pressure generated in the master cylinder 102 is fed from the hydraulic pressure ports 118 and 119 via the hydraulic pressure control unit 5 to the wheel cylinders 4 of the respective wheels to generate a braking force on the vehicle.

When the operation on the brake pedal 11 is released, the input piston 132, the primary piston 110, and the secondary piston 111 retract, the primary chamber 116 and secondary chamber 117 are depressurized, and the braking is released. Note that, the secondary piston 111 acts depending on the hydraulic pressure of the primary piston 110, and a description of the secondary piston 111 is thus omitted hereinafter.

During the braking, a part of the hydraulic pressure in the primary chamber 116 is received by the input piston 132 on a pressure reception area O smaller than a pressure reception area N of the primary piston 110, and the reaction force thereof is imparted via the input rod 134 to the brake pedal 11. As a result, on the depression stroke of the brake pedal 11, the reaction force depending on the brake hydraulic pressure (braking force) in the master cylinder 102 acts, and an excellent brake operation feeling can be provided. On this occasion, through control to change a relative position of the primary piston 110 with respect to the input piston 132, spring forces of the springs 137 and 138 can be applied to the input piston 132, thereby increasing and decreasing the reaction force to the input rod 134, and a brake pedal reaction force appropriate during brake control such as servo control, brake assistance control, and the regenerative cooperation control can be imparted.

Moreover, if the electric motor 140 becomes inoperable due to a failure, by moving the input piston 132 forward by the operation on the brake pedal 11, and abutting the step portion 132A of the input piston 132 against the intermediate wall 130, thereby directly propelling the primary piston 110, the brake hydraulic pressure can be generated in the master cylinder 102, thereby maintaining the braking function.

Figure 10:
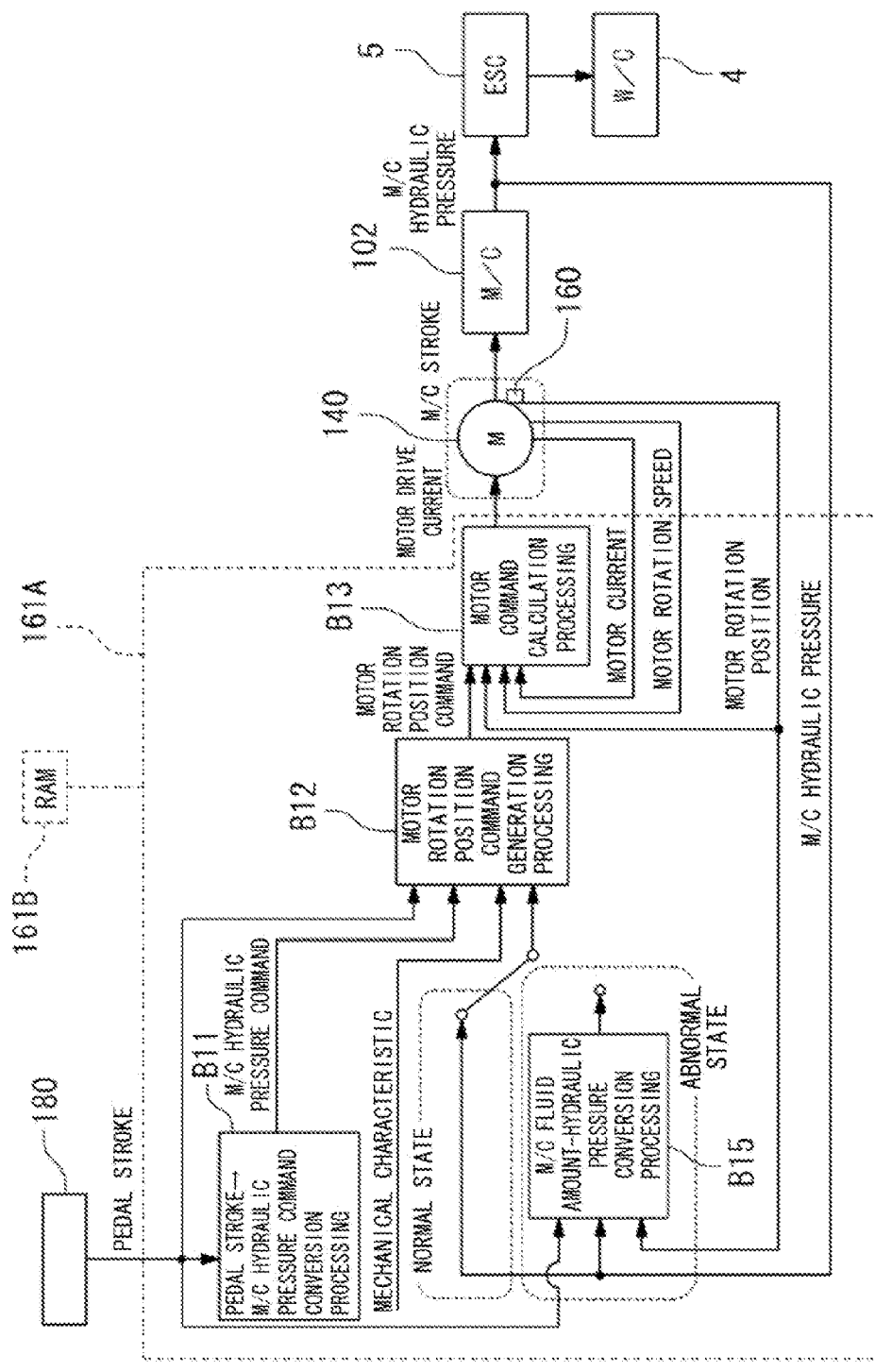
FIG. 10 is a block diagram illustrating control of an electric motor by a controller of the brake control apparatus of FIG. 8.
Figure 11:
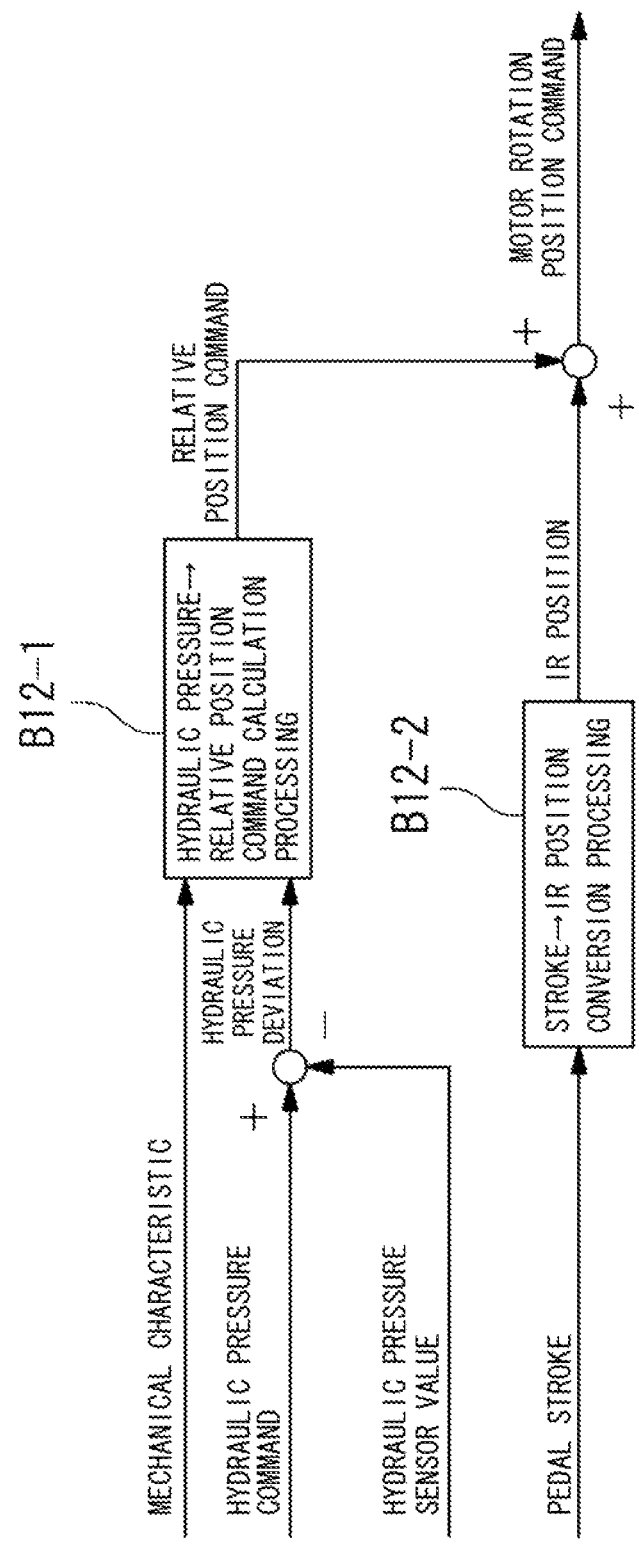
FIG. 11 is a block diagram illustrating processing of converting, by the controller, a stroke of a brake pedal into a rotation position command directed to the electric motor in the brake control apparatus illustrated in FIG. 8.
Figure 12:
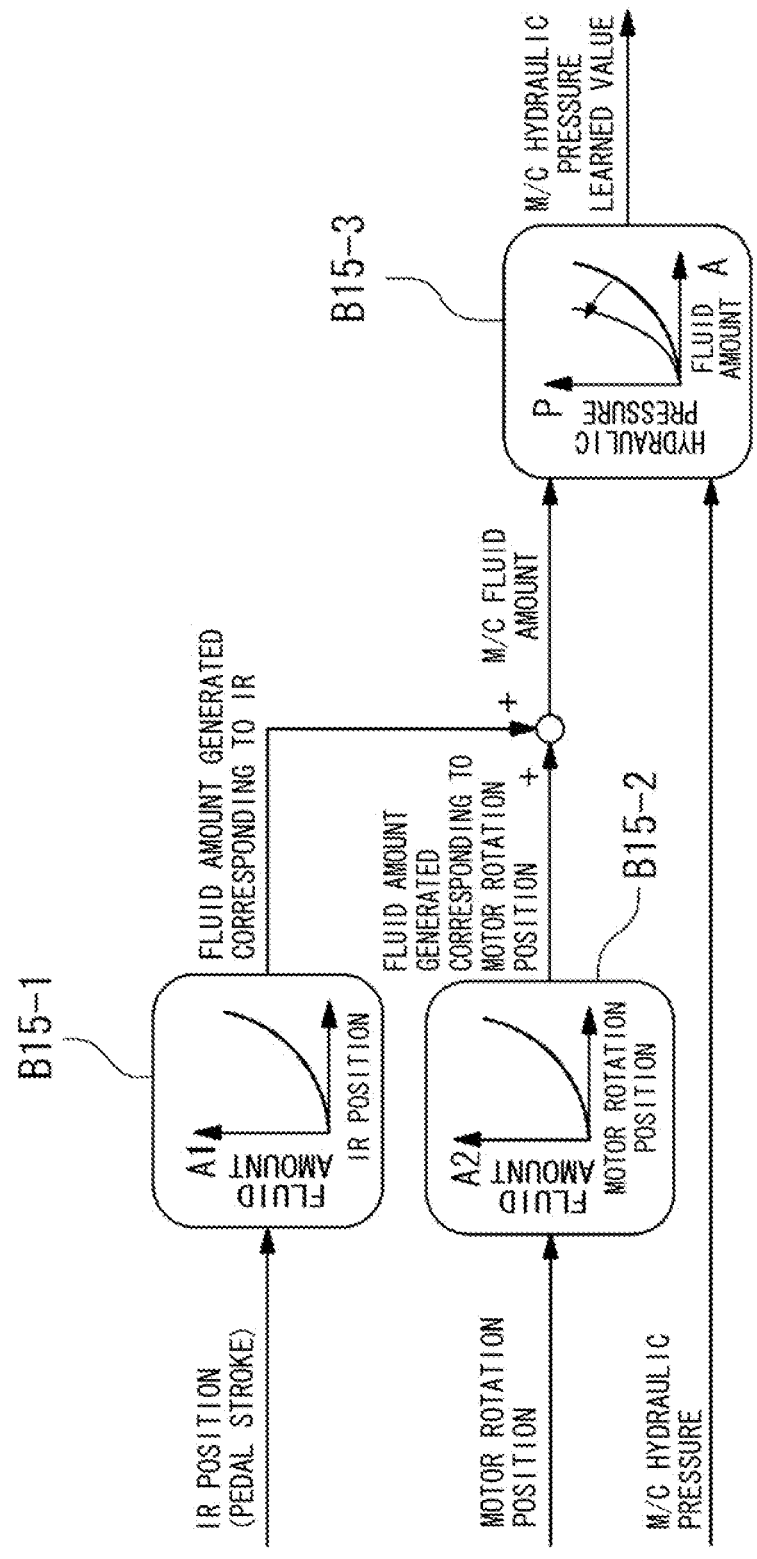
FIG. 12 is a block diagram illustrating processing of generating and updating a table representing a relationship between a brake hydraulic pressure and a discharged fluid amount of a master cylinder during braking

Mainly referring to FIGS. 10 to 12, a more detailed description is now given of the control for the electric motor 140 by the controller 161. The controller 161 monitors a state of the hydraulic pressure sensor 172, and switches the control between a normal state and an abnormal state of the hydraulic pressure sensor 172, thereby maintaining the control for the electric motor 140 even during the abnormal state. On this occasion, the abnormality of the hydraulic pressure sensor 172 refers, as in the first embodiment described above, to the case where the detection signal of the hydraulic pressure sensor 172 cannot be obtained. FIG. 10 is a block diagram of the control for the electric motor by the controller 161, FIG. 11 illustrates processing of converting the stroke (operation amount) of the brake pedal 11 into a rotation position command for the electric motor 140, and FIG. 12 illustrates update processing of a learned value of the brake hydraulic pressure with respect to a brake fluid amount (discharged fluid amount of the master cylinder) supplied from the master cylinder.

(Normal State of Hydraulic Pressure Sensor)

Referring to FIG. 10, a description is given of the control by the controller 161 in the normal state of the hydraulic pressure sensor 172. When the brake pedal 11 is operated and the brake pedal operation amount (brake pedal stroke) is input from the stroke sensor 180, a pedal stroke-master cylinder hydraulic pressure conversion processing module B11 in the ECU 161A of the controller 161 converts the input brake pedal stroke into a master cylinder hydraulic pressure command (target hydraulic pressure). On this occasion, the master cylinder hydraulic pressure command is obtained from table information storing a characteristic of the master cylinder hydraulic pressure corresponding to the brake pedal stroke stored in the RAM 161B in advance. Then, a motor rotation position command generation processing module B12 generates a motor rotation position command based on the master cylinder hydraulic pressure command.

As illustrated in FIG. 11, the motor rotation position command generation processing module B12 calculates the hydraulic pressure deviation by subtracting the master cylinder hydraulic pressure value detected by the hydraulic pressure sensor 172 from the master cylinder hydraulic pressure command, and controls a hydraulic pressure-relative position command calculation processing module B12-1 to process the hydraulic pressure deviation based on a coefficient representing a mechanical characteristic of the electric booster device 104 stored in the RAM 161B, thereby carrying out a conversion to a relative position command (position deviation) relating to a relative position between the input rod 134 and the primary piston 110. Moreover, the pedal stroke is input to a stroke-input rod position conversion processing module B12-2. The stroke-input rod position conversion processing module B12-2 converts the pedal stroke to an input rod position based on a predetermined conversion equation or table information stored in the RAM 161B. Addition processing is applied to the relative position command and the input rod position command calculated in this way to calculate the motor rotation position command.

The controller 161 controls, depending on the calculated motor rotation position command, a motor command calculation processing module B13 illustrated in FIG. 10 to calculate, based on a motor rotation position and a motor rotation speed detected by the resolver 160, and a motor current detected by the current sensor 162, a motor drive current for driving the electric motor 140, and supplies the electric motor 140 with the motor drive current. As a result, the electric motor 140 is activated, moves forward the primary piston 110 of the master cylinder 102, thereby generating the brake hydraulic pressure, and supplies the wheel cylinders 4 with the brake hydraulic pressure via the hydraulic pressure control unit 5, thereby braking the vehicle.

In this way, in the normal state of the hydraulic pressure sensor 172, the controller 161 controls the action of the electric motor 140 based on the brake hydraulic pressure in the master cylinder 102 detected by the hydraulic pressure sensor 172, thereby feeding the desired brake hydraulic pressure corresponding to the operation amount of the brake pedal 11 from the master cylinder 102 via the hydraulic pressure control unit 5 to the wheel cylinders 4 to obtain desired braking forces.

Moreover, in the normal state of the hydraulic pressure sensor 172, the controller 161 controls an M/C fluid amount-hydraulic pressure conversion processing module B15 (fluid amount detection means) to learn a relationship between a supplied fluid amount of the master cylinder 102 to the wheel cylinders 4, which is the discharged fluid amount (value relating to the discharge fluid amount) of the master cylinder, and the brake hydraulic pressure in the master cylinder 102, and generates and updates an M/C fluid amount-hydraulic pressure table representing the relationship. Referring to FIG. 12, a description is given of the generation and update processing of the M/C fluid amount-hydraulic pressure table.

Referring to FIG. 12, by multiplying the position (stroke: IR position) of the input rod 134 (input piston 132) and the pressure reception area O of the input piston 132 stored in the RAM 161B by each other, a supplied brake fluid amount (generated fluid amount corresponding to IR: A1) from the master cylinder 102 to the wheel cylinders 4 generated by the stroke of the input rod 134 is calculated (processing block B15-1). Moreover, by multiplying the motor rotation position and the pressure reception area N of the primary piston 110 stored in the RAM 161B, a supplied brake fluid amount (generated fluid amount corresponding to motor rotation position: A2) from the master cylinder 102 to the wheel cylinders 4 generated by the stroke of the primary piston 110 is calculated (processing block B15-2). Then, by adding the generated fluid amount corresponding to IR and the generated fluid amount corresponding to the motor rotation position to each other, an M/C fluid amount as a discharge fluid amount of the master cylinder which is a total supplied fluid amount from the master cylinder 102 to the wheel cylinders 4 is calculated. A relationship between the M/C fluid amount (A) calculated in this way, and the hydraulic pressure (M/C hydraulic pressure) of the master cylinder 102 detected by the hydraulic pressure sensor 172 is plotted, and an M/C fluid amount-hydraulic pressure table representing the M/C fluid amount-hydraulic pressure characteristic is generated, stored in the RAM 161B, and updated as needed (processing block B15-3).

(Abnormal State of Hydraulic Pressure Sensor)

Referring to FIG. 10, a description is now given of control by the controller 161 if, due to a failure of the hydraulic pressure sensor 172 or the like, the master cylinder hydraulic pressure cannot be detected, namely in the abnormal state of the hydraulic pressure sensor 172. Depending on the brake pedal operation amount, the motor rotation position command generation processing module B12 uses the master cylinder hydraulic pressure calculated by using, in place of the detection signal by the hydraulic pressure sensor 172, the latest M/C fluid amount-hydraulic pressure table generated and updated in the generation and update processing of the M/C fluid amount-hydraulic pressure table illustrated in FIG. 12, based on the rotation position (position of the primary piston 110) of the electric motor 140 detected by the resolver 160 and the position (position of the input piston 132) of the input rod 134 detected by the stroke sensor 180, as the target hydraulic pressure. Note that, in the abnormal state of the hydraulic pressure sensor 172, the hydraulic pressure control by the hydraulic pressure control unit 5 is not carried out, and the master cylinder hydraulic pressure is directly fed to the wheel cylinders 4. As a result, even in the abnormal state of the hydraulic pressure sensor 172, based on the master cylinder hydraulic pressure obtained from the latest M/C fluid amount-hydraulic pressure table learned and updated in the normal state, the braking force control depending on the hydraulic rigidity of the wheel cylinders 4 before the failure occurs to the hydraulic pressure sensor 172 can be carried out. Thus, the vehicle deceleration with respect to the brake operation is restrained from fluctuating, thereby reducing the sense of discomfort of the driver.

Figure 13:
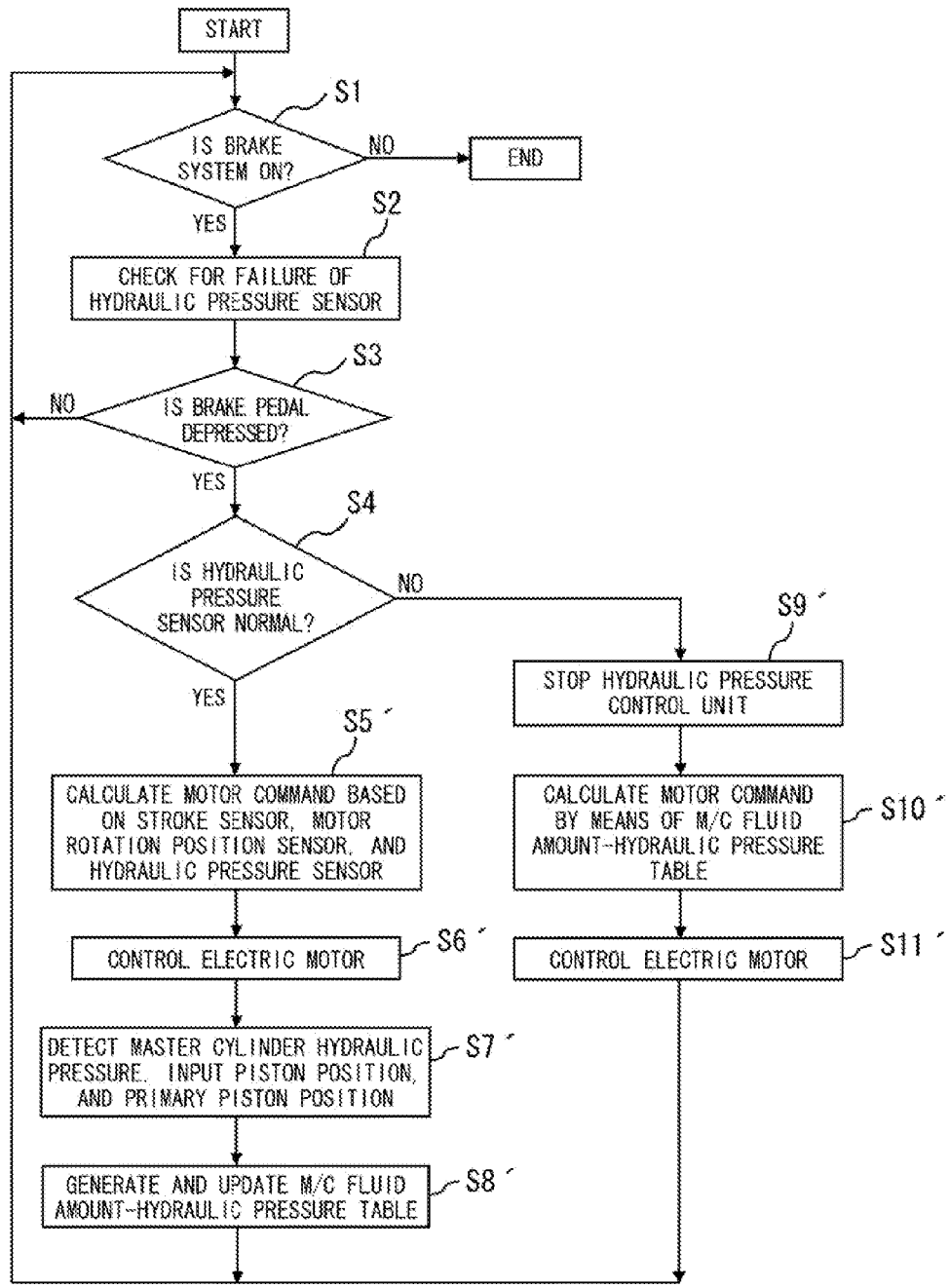
FIG. 13 is a flowchart illustrating control of the electric motor by the controller of the brake control apparatus of FIG. 8.

Referring to FIG. 13, a description is now given of an example of a control flow for executing, by the controller 161, the above-mentioned brake control. The control flow is the same as that of the first embodiment illustrated in FIG. 6 except for each of Steps S5-S11, a "prime symbol (')" is added to each of the steps, and a detailed description is given of only the different portions.

In Step S5', the controller 161 calculates, based on the detections by the various sensors including the stroke sensor 180, the hydraulic pressure sensor 172, and the current sensor 162, by executing the processing in the normal state in FIG. 10, the drive current for the electric motor 140, and the processing proceeds to Step S6'. In Step S6', the controller 161 activates the electric motor 140 by the drive current, thereby generating the brake hydraulic pressure in the master cylinder 102, and feeds the brake hydraulic pressure via the hydraulic pressure control unit 5 to the wheel cylinders 4, thereby generating the braking forces, and the processing proceeds to Step S7'. In Step S7', the controller 161 detects, by means of the stroke sensor 180, the position of the input piston 121, detects, by means of the resolver 160, the position of the primary piston 110, and detects, by means of the hydraulic pressure sensor 172, the master cylinder hydraulic pressure, and the processing proceeds to Step S8'. In Step S8', based on the input piston position, the primary piston position, and the master cylinder hydraulic pressure detected in Step S7', as illustrated in FIG. 12, the M/C fluid amount-hydraulic pressure table is generated and updated.

On the other hand, when, in Step S4, the controller 161 determines that the hydraulic pressure sensor 172 is not normal (abnormal), the controller 161 stops, in Step S9, the action of the hydraulic pressure control unit 5, and proceeds to Step S10'. In Step S10', the controller 161 executes the processing in the abnormal state in FIG. 10, executes the motor rotation position command generation processing B12 by using the master cylinder hydraulic pressure calculated by using the latest M/C fluid amount-hydraulic pressure table based on the input piston position and the primary piston position (M/C fluid amount), thereby generating a motor rotation position command (value relating to the target discharged fluid amount), and calculates the motor drive current by the motor command calculation processing B5', and the processing proceeds to Step S11'. In Step S11', the controller 161 activates, by the drive current, the electric motor 140, thereby generating the hydraulic pressure in the master cylinder 102, and feeds the hydraulic pressure via the hydraulic pressure control unit 5 to the wheel cylinders 4, thereby generating the braking forces. In this way, when the hydraulic pressure 172 is abnormal, through control of the electric motor 140 based on the master cylinder hydraulic pressure calculated by means of the M/C fluid amount-hydraulic pressure table generated and updated in the normal state, the fluctuation in the brake operation feeling is minimized, thereby reducing the sense of discomfort.

Figure 4:
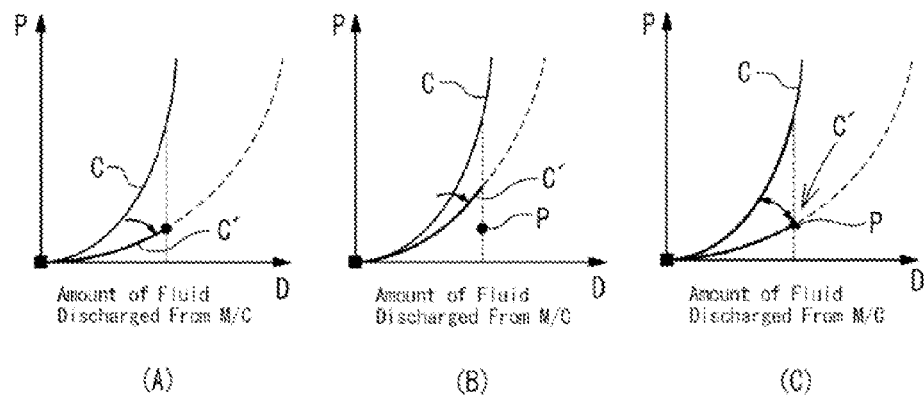
FIG. 4 is graphs for illustrating a method of storing and updating a brake characteristic by the controller in the brake control apparatus of FIG. 1.
Figure 5:
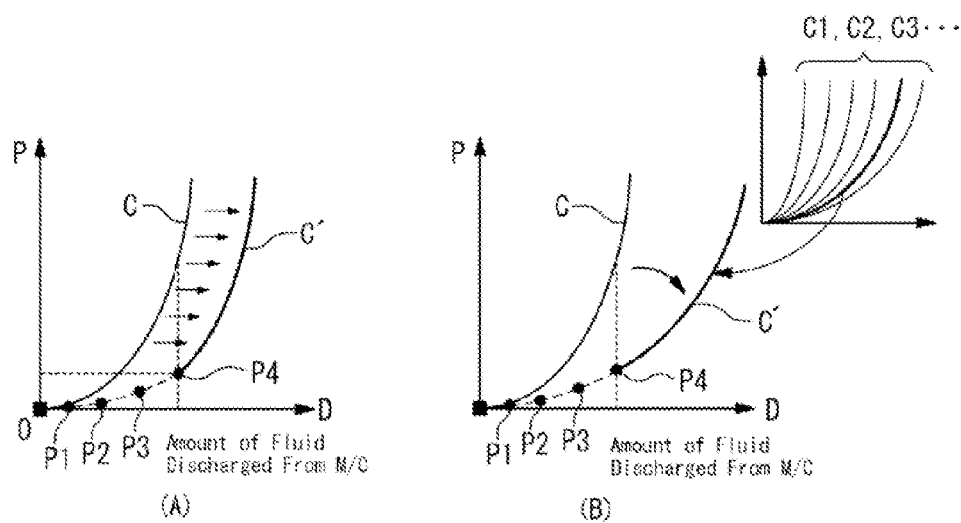
FIG. 5 is graphs for illustrating a method of interpolation when the brake characteristic is stored and updated by the controller in the brake control apparatus of FIG. 1.

In the second embodiment, the update of the M/C fluid amount-hydraulic pressure table may be carried out by executing the same processing as the update method for the brake characteristic representing the relationship between the master cylinder hydraulic pressure and the motor rotation position (namely, the M/C fluid amount) described referring to FIGS. 4, 5, and 7 in the first embodiment. As a result, the sense of discomfort in the operation of the brake pedal 11 resulting from switching in the control from the normal state to the abnormal state of the hydraulic pressure sensor 127 can be reduced.

The value relating to the discharged fluid amount according to the present invention may be the discharged fluid amount itself, or may be, as in the embodiment, the value determining the discharged fluid amount, namely, the piston position of the master cylinder, the rotation position of the motor for moving the piston, or the like.

Note that, the present invention is not limited to the above-mentioned embodiments, and can be changed within the scope of the description of Claims.

The invention claimed is:

1. A brake control apparatus, comprising:
an operation amount detector for detecting an operation amount of a brake pedal;
an electric motor for moving a piston of a master cylinder;
a hydraulic pressure detector for detecting a brake hydraulic pressure in the master cylinder; and
a control device for setting, depending on the detection by the operation amount detector, a target hydraulic pressure of the master cylinder, and controlling, based on a detected value of the hydraulic pressure detector, an action of the electric motor so that the master cylinder attains the target hydraulic pressure, wherein:
the control device connects to fluid amount detection means for detecting a value relating to a discharged fluid amount of the master cylinder; and
the control device is configured to:
update, when the hydraulic pressure detector is normal, based on the detected value by the hydraulic pressure detector and a detection result by the fluid amount detection means, a brake characteristic representing a relationship between the brake hydraulic pressure of the master cylinder and the value relating to the discharged fluid amount; and
calculate, when the hydraulic pressure detector is abnormal, by using the brake characteristic, a value relating to a target discharged fluid amount corresponding to the target hydraulic pressure of the master cylinder, and control the action of the electric motor so that the detected value by the fluid amount detection means attains the value relating to the target discharged fluid amount.

2. A brake control apparatus according to claim 1, wherein:
the fluid amount detection means detects, as a value of the discharged fluid amount, a displacement of the piston of the master cylinder; and
the control device updates the brake characteristic based on the displacement of the piston.

3. A brake control apparatus according to claim 2, wherein the fluid amount detection means detects the displacement of the piston of the master cylinder based on a rotation position of the electric motor.

4. A brake control apparatus according to claim 2, wherein the fluid amount detection means detects the displacement of the piston of the master cylinder by the operation amount detector.

5. A brake control apparatus according to claim 1, wherein:
the piston of the master cylinder includes a booster piston moved by the electric motor, and an input piston provided so as to be displaced relatively to the booster piston, having a distal end side facing a pressure chamber of the master cylinder, and moved by an operation on the brake pedal;
the fluid amount detection means includes a rotation position detector for detecting a displacement of the booster piston based on a rotation position of the electric motor, and the operation amount detector for detecting the displacement of the input piston based on an operation stroke of the brake pedal; and
the control device calculates, based on a pressure reception area of the brake hydraulic pressure generated in the master cylinder and applied to the booster piston, and the displacement of the booster piston detected by the rotation position detector, a discharged fluid amount by the booster piston, calculates, based on a pressure reception area of the brake hydraulic pressure generated in the master cylinder and applied to the input piston, and the displacement of the input piston detected by the operation amount detector, a discharged fluid amount by the input piston, and updates the brake characteristic based on a sum of both of the calculated discharged fluid amounts and on the brake hydraulic pressure of the master cylinder.

6. A brake control apparatus according to claim 1, further comprising a stroke simulator for imparting, when the electric motor is driven by an operation on the brake pedal, a reaction force to the operation amount of the brake pedal, and moving, when the electric motor is not driven by the operation on the brake pedal, the piston of the master cylinder.

7. A brake control apparatus according to claim 1, wherein the control means is further configured to:
update, when the hydraulic pressure detector is normal, the brake characteristic for each of heat quantities generated by frictional heat during braking; and
calculate, when the hydraulic pressure detector is normal, the heat quantity depending on a usage state of a wheel cylinder to which the master cylinder feeds the brake hydraulic pressure, and control the action of the electric motor by using the brake characteristic depending on the calculated heat quantity.

* * * * *